(12) United States Patent
Seeley et al.

(10) Patent No.: US 11,949,458 B2
(45) Date of Patent: Apr. 2, 2024

(54) APPARATUSES AND METHODS FOR OPTICAL CODE-DELAY REFLECTOMETRY (OCODR)

(71) Applicant: SEQUENT LOGIC, LLC, Logan, UT (US)

(72) Inventors: Ryan Seeley, North Logan, UT (US); Rhett H. Redd, Logan, UT (US)

(73) Assignee: SEQUENT LOGIC, LLC, Logan, UT (US)

( * ) Notice: Subject to any disclaimer, the term of this patent is extended or adjusted under 35 U.S.C. 154(b) by 0 days.

(21) Appl. No.: 17/813,831

(22) Filed: Jul. 20, 2022

(65) Prior Publication Data

US 2023/0361880 A1 Nov. 9, 2023

Related U.S. Application Data

(60) Provisional application No. 63/203,363, filed on Jul. 20, 2021.

(51) Int. Cl.
| | |
|---|---|
| *H04B 10/00* | (2013.01) |
| *H04B 10/071* | (2013.01) |
| *H04B 10/532* | (2013.01) |
| *H04B 10/61* | (2013.01) |
| *H04J 13/00* | (2011.01) |
| *H04J 14/00* | (2006.01) |

(52) U.S. Cl.
CPC ......... *H04B 10/532* (2013.01); *H04B 10/071* (2013.01); *H04B 10/614* (2013.01); *H04J 13/0062* (2013.01)

(58) Field of Classification Search
CPC ......... G01L 1/242; G01L 1/246; G01L 1/247; H04B 10/071
See application file for complete search history.

(56) References Cited

U.S. PATENT DOCUMENTS

2019/0285487 A1* 9/2019 Seeley .................. G01L 1/246
2021/0314063 A1* 10/2021 Huang .................. G02B 6/022

* cited by examiner

*Primary Examiner* — Daniel G Dobson
(74) *Attorney, Agent, or Firm* — TraskBritt

(57) ABSTRACT

Apparatuses and methods for optical code-delay reflectometry (OCoDR) are disclosed. An apparatus includes a modulator, a receiver, and control circuitry. The modulator is configured to receive incident electromagnetic (EM) radiation at a substantially fixed frequency generated by one or more EM radiation sources. The incident EM radiation includes continuous-wave EM radiation. The modulator is configured to impart a sequence onto an amplitude, a phase, or both of the incident EM radiation to generate modulated EM radiation. The modulated EM radiation includes continuous-wave EM radiation. The receiver is configured to receive reference EM radiation. The receiver is also configured to receive reflected EM radiation from an optical system responsive to the modulated EM radiation and generate interfered EM radiation responsive to the reference EM radiation and the reflected EM radiation. The receiver is further configured to generate a continuous interferogram responsive to the interfered EM radiation.

22 Claims, 21 Drawing Sheets

US 11,949,458 B2

APPARATUSES AND METHODS FOR OPTICAL CODE-DELAY REFLECTOMETRY (OCODR)

CROSS-REFERENCE TO RELATED APPLICATION

This application claims the benefit under 35 U.S.C. § 119(e) of U.S. Provisional Patent Application Ser. No. 63/203,363, filed Jul. 20, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-SC0020755 awarded by the United States Department of Energy and under Contract Number N683352000183 awarded by the United States Department of the Navy. The government has certain rights in the invention.

TECHNICAL FIELD

This disclosure relates generally to apparatuses and methods for optical sensing, and more specifically to optical sensing using continuous-wave electromagnetic (EM) radiation.

BACKGROUND

Optical systems such as optical fibers may be used as sensors in a variety of applications. Modulation in mechanical stress of an optical system due to, for example strain or temperature fluctuations, may change measurable optical properties of the optical system.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
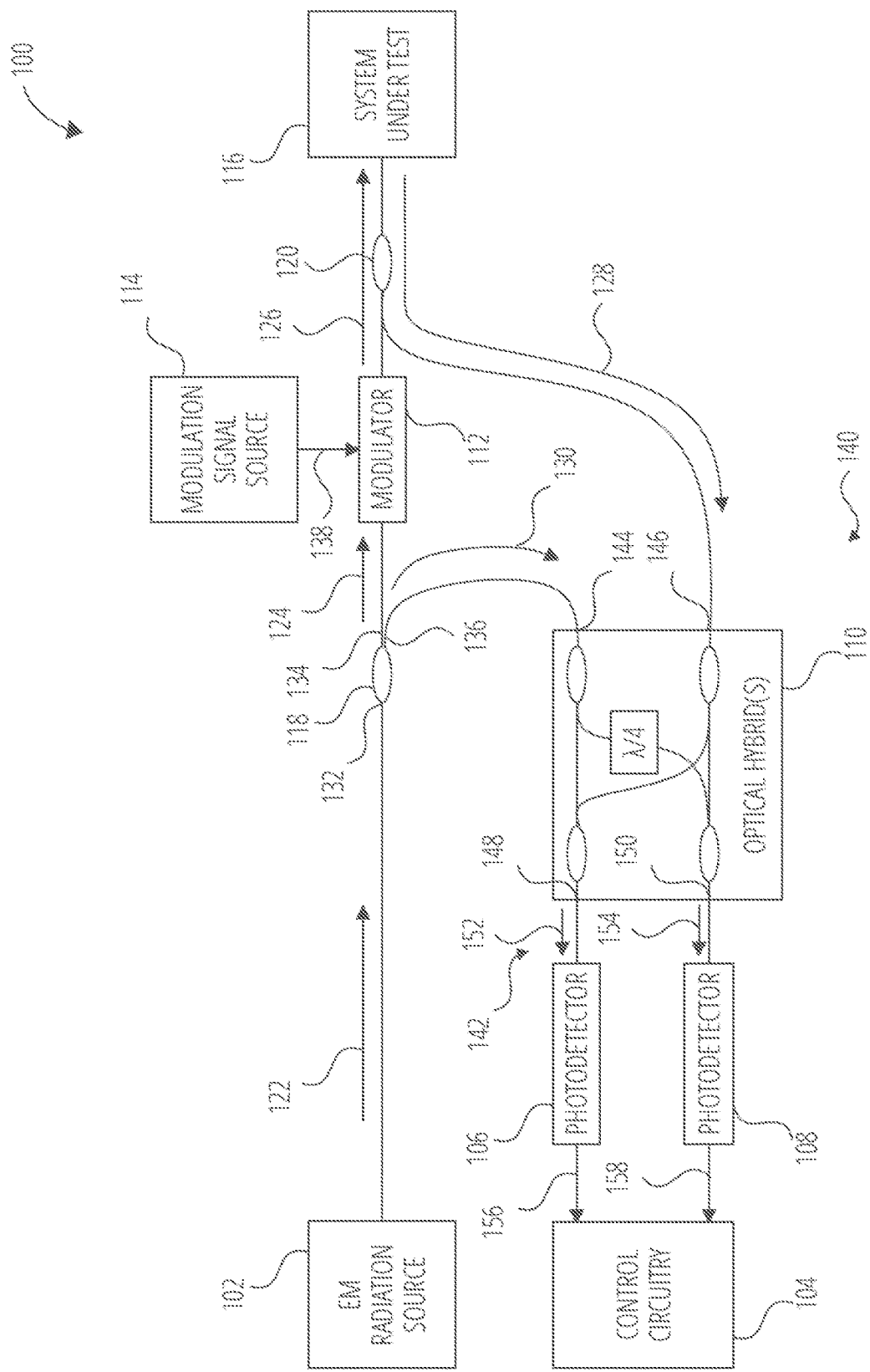
FIG. 1 is a block diagram of a measurement system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Graphics Processing Unit (GPU), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "continuous-wave EM radiation" refers to EM radiation that includes a continuous wave, in contrast to a pulse-based EM radiation. Continuous-wave EM radiation may be an at least substantially sinusoidal wave, or may be modulated (e.g., amplitude modulated, phase modulated, or both). Continuous-wave EM radiation may refer to being continuous over a given sample period in time over which a new set of measurements are taken along a desired optical time-of-flight delay range of the system under test. Whereas in pulsed OTDR or OFDR systems EM radiation may be emitted for only 0.1% or less of the sample period, continuous-wave EM radiation may for example be emitted 50% or greater of the sample period.

Pulse-based EM radiation may be used in optical sensing. Since the EM radiation is only active during pulses, then inactive between pulses, relatively few photons may be provided to an optical system. As a result, relatively few photons are also received at a detector. Since the detector receives relatively few photons, a relatively low signal to noise ratio (SNR) of reflected EM radiation received by the detector may be expected for pulse-based EM radiation optical sensing. Also, relatively short reach (e.g., relatively short sensing fibers) may be enabled using pulse-based EM radiation optical sensing. In addition, the use of amplifiers (e.g., semiconductor optical amplifiers (SOAs), Erbium-Doped Fiber Amplifiers (EDFAs), Raman amplifiers) may be required to amplify reflected EM radiation that, on average, is low-power. As a result, an increased cost, an increased noise penalty, or both may be expected for optical sensing using pulse-based EM radiation.

In pulse-based optical frequency domain reflectometry (OFDR) the sample rate is tied to a single optical frequency sweep. Increasing sweep speed improves sample rate but also requires higher required demodulation bandwidth. In pulse-based optical time-domain reflectometry (OTDR) the sample rate is limited by overall time-of-flight through a sensor network under test. This is due to a requirement to create a pulse train from a single pulse.

In pulse-based OFDR (including time-gated OFDR) the measurand SNR is limited to on the order of 1 microstrain ($\mu\varepsilon$) or several hundred nanostrain ($n\varepsilon$) for strain measurements, or on the order of tenths of a degree Celsius (° C.). Transient phenomena are averaged over the required pseudo-linear optical frequency sweep and typically returned as a single value. Pulse-based OTDR appears to have the same SNR limitations as pulse-based OFDR with its accompanying strain limitations.

In OFDR, for a given frequency spectrum, efficient spectrum utilization requires sensors or features of interest to be evenly spaced (e.g., evenly spaced along a fiber under test or space under test) such that sensors (or reflective features) have even spacing and high occupation of the OFDR frequency spectrum. If sensors (or features) cover a subset or irregular-spaced portion of the spectrum, it may be difficult to efficiently demodulate the sensors (features).

Pulse-based OTDR and OFDR techniques may require specialized components that are relatively expensive, adding to the overall cost of manufacturing pulse-based OTDR and OFDR systems.

As a specific example of optical sensing using pulse-based EM radiation, a 50 kilometer (km) optical time-domain reflectometer (OTDR) system with 1 meter (m) spatial resolution may be used. Assuming an EM radiation pulse having a 10 nanosecond (ns) pulse width, the pulse repetition rate would be limited to substantially 0.5 milliseconds (ms) due to a dual-pass optical time-of-flight delay (substantially 10 ns/m*50 e3 m). Assuming a peak pulse power of $P_{pk}$, an average power $P_{ave}$ is less than or equal to $P_{pk}$*10 ns/0.5 ms, or $P_{ave} \leq 2$ e-5. Although various techniques may be used to broaden a pulse while preserving spatial resolution, the average power $P_{ave}$ may only be increased by substantially an order of magnitude. As a result, the average power $P_{ave}$ may still be smaller than the peak pulse power $P_{pk}$ by substantially a factor of 10,000.

Disclosed herein is optical sensing using continuous-wave EM radiation. EM radiation may be provided to an optical system continuously rather than using pulse-based EM radiation. As a result, for a given EM radiation source output power, significantly more EM radiation is provided to the optical system for continuous-wave EM radiation as compared to pulse-based EM radiation.

An example of using continuous-wave EM radiation is OCoDR, which may be used as a continuous-wave technique. Measurands are available continuously at a relatively high rate, up to orders of magnitude faster than for OFDR techniques. As a result, OCoDR may benefit from a superior sample rate as compared to OFDR.

OCoDR may use a continuous-wave EM radiation source and therefore captures data continuously from all sensors (or reflective features) in a system under test. As compared to OTDR, OCoDR may enable capture of more photons per unit time, and therefore the SNR of the measurement for a given sample rate is superior. As compared to OTDR and OFDR there are no missing temporal data (as e.g., between OTDR pulses or between OFDR sweeps-in pulse-based OFDR a sweep may be a pulse wherein output power may be injected into a fiber under test while sweeping, then either the output power is turned off or the data are disregarded). Instead, the data may be temporally continuous and contiguous.

With OCoDR a spectral response of a system under test may "slide" across a pseudo- (or somewhat-) fixed-wavelength optical source. The dynamic range of OCoDR is therefore not limited by a wavelength sweep range as in OFDR.

Costs associated with OCoDR may also be generally less than those associated with OFDR and OTDR. Relatively less expensive components may be used, as well as lower-cost sensing fibers. By way of non-limiting examples, Rayleigh and/or Raman scattering phenomenon/phenomena may be used to perform sensing using standard telecommunications fiber or other fiber not incorporating traditional optical sensors (e.g., fiber Bragg gratings).

With OCoDR the required spectrum bandwidth may be tuned to the desired number of sensors (or features) in the fiber (or space) under test. In addition, OCoDR provides a selectivity that may be changed on the fly. Accordingly, OCoDR may provide superior spectrum utilization as compared to OFDR and OTDR.

Since OCoDR is an interferometric technique, SNR is enhanced with respect to non-interferometric techniques (e.g., as in some OTDR techniques). The amplitude of the optical field is encoded in the intensity of the signal at the photodetector and/or within the signal processing unit.

OCoDR may also have superior sensing length as compared to OFDR, which may be limited to tens or hundreds of meters. OCoDR may achieve sensing lengths on the order of several kilometers or tens of kilometers, similar to OTDR techniques. As a specific example of optical sensing using continuous-wave EM radiation, a 50 km optical system may be used. Since continuous-wave EM radiation is used, the average power $P_{ave}$ is equal to the peak power $P_{pk}$. As a result, several orders of magnitude more EM radiation is available for interrogation and acquisition as compared to optical sensing using pulse-based EM radiation. More EM radiation leads to better SNR, longer reach, or both.

OCoDR may also yield complex, polarization-diverse optical fields. OCoDR may be used in conjunction with quadrature and polarization-diverse modulation/reception to recover the full complex optical field, including state of polarization at each sensor (or feature or position) along a system under test differentiated by transmitted state of polarization. Thus, OCoDR may be used to measure birefringence of the fiber, which in turn may be exploited to measure axial loads and other phenomena, without limitation.

FIG. 1 is a block diagram of a measurement system 100, according to some embodiments. OCoDR makes use of one or more unique code sequences to interrogate an optical system under test 116. The system under test 116 may include a plurality of sensors (or e.g., features, strata, or segments). The measurement system 100 includes an EM radiation source 102, an optical splitter 118, a modulator 112, a modulation signal source 114, an optical circulator 120, a system under test 116, a receiver 140, and control circuitry 104. The EM radiation source 102 is configured to provide continuous-wave EM radiation 122 at a substantially fixed optical frequency (i.e., fixed wavelength). By way of non-limiting example, the EM radiation source 102 may be a fixed-frequency laser. Advantages are gained by using a narrow-linewidth laser such that the optical phase noise bandwidth is narrow.

The optical splitter 118 includes a splitter input 132, a first splitter output 134, and a second splitter output 136. The splitter input 132 is configured to receive the continuous-wave EM radiation 122 from the EM radiation source 102. The optical splitter 118 is configured to deliver the continuous-wave EM radiation as incident EM radiation 124 to the first splitter output 134 and as reference EM radiation 130 to the second splitter output 136.

A modulation signal source 114 feeds a modulation signal 138 (an electronic signal or electronic signals) to the modulator 112 to modulate the incident EM radiation 124. The modulator 112 is configured to receive the incident EM radiation 124 from the first splitter output 134. The modulator 112 is configured to impart a sequence onto an amplitude, a phase, or both of the incident EM radiation 124 to generate modulated EM radiation 126 responsive to the modulation signal 138 from the modulation signal source 114. By way of non-limiting example, the modulator 112 may use real pattern modulation (e.g., binary phase shift keying (BPSK)) or complex pattern modulation (e.g., quadrature phase shift keying (QPSK)). Also by way of non-limiting example, the modulator 112 may impart a real or complex sequence onto a single polarization component or to dual (for example, orthogonal, without limitation) polarization components of the incident EM radiation 124. The modulated EM radiation 126 includes continuous-wave EM radiation. By way of non-limiting example, the phase of the incident EM radiation 124 may be modulated with a simple phase modulator. Also by way of non-limiting example the incident EM radiation 124 may be modulated with a real or complex (e.g., Mach-Zehnder) modulator.

The optical circulator 120 is configured to pass the modulated EM radiation 126 from the modulator 112 to the system under test 116, and pass the reflected EM radiation 128 from the system under test 116 to the receiver 140 (a second input 146 of the receiver 140). In some embodiments, rather than using the optical circulator 120, a splitter, or a splitter and an isolator may instead be used to pass the modulated EM radiation 126 to the system under test 116 and pass the reflected EM radiation 128 to the receiver 140.

FIG. 1 illustrates optical couplers being used as splitters and/or combiners (e.g., the optical splitter 118, the optical circulator 120), but other devices could be used. Non-limiting example embodiments of splitters include a fiber-optic coupler, a free-space beamsplitter, a photonic integrated circuit (PIC) waveguide splitter, or other splitters. Non-limiting example embodiments of combiners include a fiber-optic coupler, a free-space beamsplitter, a photonic integrated circuit (PIC) waveguide combiner, or other combiners. Another non-limiting example embodiment of the optical splitter 118 could be a free-space or fiber-optic circulator. In addition, other components such as a polarization beamsplitter, an isolator, or other component may be used to improve signal power or other aspects of the measurement system 100.

In some embodiments the system under test 116 may include an optical fiber. An optical fiber exhibits Rayleigh backscatter due to random fluctuations in core ellipticity, concentricity, dopant concentration, and other properties. These random fluctuations due to imperfections in manufacturing of the optical fiber may have a detectable signature for measuring mechanical stress or temperature acting on the optical fiber. In some embodiments the optical fiber may include fiber Bragg grating (FBG) sensors, partial reflectors, or other sensors. In some embodiments the system under test 116 may be a free-space optical element (e.g., a free-space environment or space under test, which may or may not include air). By way of non-limiting example, the modulated EM radiation 126 may be interfaced to the free-space optical element using a system of lenses, other light-guiding apparatuses, etc., such that a three-dimensional space is scanned.

Fiber Bragg gratings may be used as sensors, but in some embodiments may have a disadvantage in that return loss is a strong function of wavelength and therefore might offer poor SNR if a desired sensor exhibits a weak response at wavelength $\lambda_0$ and an undesired sensor exhibits a strong response at the same wavelength for a given set of environmental conditions acting on the system under test 116. Chirped fiber Bragg gratings exhibit a relatively constant return loss over their wavelength response and therefore do not suffer from this disadvantage. Fiber Bragg gratings that exhibit a wideband (relative to a desired system dynamic range) response may also improve operation relative to this disadvantage. Standard telecoms fiber exhibits micro-variations in ellipticity and core concentricity that result in a sufficient level of Rayleigh scatter to perform sensing according to the present disclosure. The random scattering centers of optical fiber may be modeled as a fiber Bragg grating with random refractive index variation and offers similar advantages to a system under test 116 comprising many wideband fiber Bragg gratings. An advantage of using standard telecoms fiber in conjunction with OCoDR via Rayleigh scattering analysis is that the cost of the sensor fiber drops dramatically.

Figure 15:
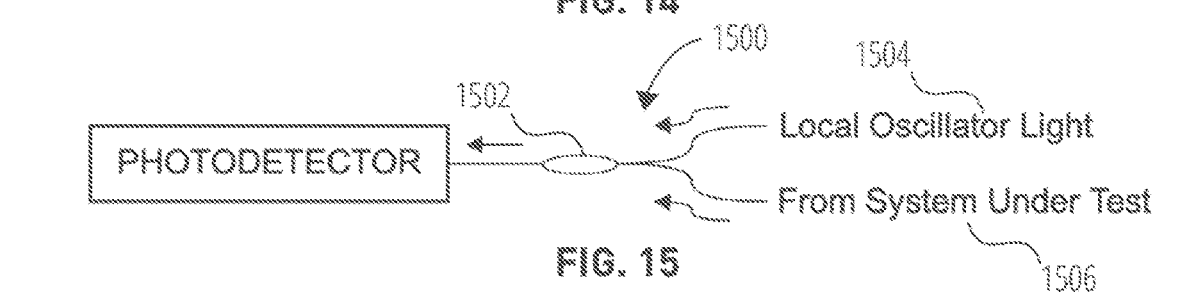
FIG. 15 is a representation of a real receiver, according to some embodiments.

The receiver 140 includes one or more optical hybrids 110 (e.g., 90 degree hybrids) and multiple photodetectors (photodetector 106, photodetector 108). By way of non-limiting example, the receiver 140 may be configured with a polarization splitter and a filter (e.g., a polarization beamsplitter) and two optical hybrids to generate two signals for each orthogonal polarization state. In some embodiments the receiver 140 may not use an optical hybrid (e.g., a single coupler may be used rather than an optical hybrid 110 as illustrated in FIG. 15). In such embodiments a single coupler may be used to interface outputs to a single photodetector. Such a modulation scheme may be single-sideband and may utilize complex modulation. The receiver 140 is configured to receive the reference EM radiation 130 from the second splitter output 136, receive reflected EM radiation 128 from the system under test 116 responsive to the modulated EM radiation 126, and generate interfered EM radiation 142 responsive to the reference EM radiation 130 and the reflected EM radiation 128.

Each of the optical hybrids 110 includes a first input 144 (sometimes known as a "local oscillator" input), a second input 146, a first output 148, and a second output 150. Each of the optical hybrids 110 receives, as inputs, two optical fields (i.e., the reference EM radiation 130 and the reflected EM radiation 128). The first hybrid input 144 receives the reference EM radiation 130 and the second input 146 receives the reflected EM radiation 128. Each of the optical hybrids 110 splits the reference EM radiation 130 and the reflected EM radiation 128, and delays one of the reference EM radiation 130 and the reflected EM radiation 128 with respect to the other by substantially one quarter wave (λ/4) at a nominal wavelength λ. The optical hybrids 110 interfere the reference EM radiation 130 and the reflected EM radiation 128 to produce interfered EM radiation 142.

The interfered EM radiation 142 includes an in-phase interferometric output 152 provided at the first hybrid output 148 and a quadrature interferometric output 154 provided at the second hybrid output 150. In some embodiments the optical hybrids 110 may provide two outputs for in-phase and another two outputs for quadrature. The intensities of the in-phase interferometric output 152 and the quadrature interferometric output 154 may be proportional to the amplitude of the beat signals formed by interference of the reference EM radiation 130 and the reflected EM radiation 128.

The photodetector 106 is configured to convert the in-phase interferometric output 152 to a first measurement signal 156, and provide the first measurement signal 156 to the control circuitry 104. Similarly, the photodetector 108 is configured to convert the quadrature interferometric output 154 to a second measurement signal 158, and provide the second measurement signal 158 to the control circuitry 104. The photodetector 106 and the photodetector 108 may include photodiodes. By way of non-limiting example, in embodiments where the optical hybrids 110 include two outputs for in-phase and another two outputs for quadrature, the photodetector 106 and the photodetector 108 may pair two in-phase outputs to subtract one photodiode current from another. The same may be done for two quadrature outputs.

The control circuitry 104 is configured to receive the first measurement signal 156 and the second measurement signal 158, interpret the first measurement signal 156 and the second measurement signal 158, and apply appropriate signal processing to uniquely extract information from each sensor, feature, stratum, and/or segment of the system under test 116. In some embodiments the control circuitry 104 may include the modulation signal source 114 and may therefore generate the modulation signal 138 and provide the modulation signal 138 to the modulator 112. In some embodiments the control circuitry 104 may include transimpedance amplifiers, which may be used at inputs of the control circuitry 104 to convert electrical currents provided by the photodetector 106 and the photodetector 108 to electrical voltage potentials. In some embodiments the control circuitry 104 includes a waveform acquisition unit (e.g., analog signal conditioning electronics, an analog to digital converter) to sample the electrical voltage potentials.

The control circuitry 104 is also configured to process the first measurement signal 156 and the second measurement signal 158 to process a continuous interferogram, which may be generated at combining couplers of the optical hybrid 110, responsive to the interfered EM radiation 142, which is represented by the first measurement signal 156 and the second measurement signal 158. In some embodiments the control circuitry 104 includes a controller (e.g., a processing unit such as a central processing unit (CPU), a field programmable gate array (FPGA), a graphics processing unit (GPU), a system on chip (SoC), other processing units, or combinations thereof).

In operation, the EM radiation source 102 provides the continuous-wave EM radiation 122 at substantially a fixed optical frequency (wavelength). The optical splitter 118 splits the continuous-wave EM radiation 122 to source the modulator 112 and the first hybrid input 144 (e.g., the local oscillator input) of the receiver 140 (of the optical hybrids 110). In the absence of the modulator 112, for the sake of discussion only, and assuming that the system under test 116 is a fiber under test having only one non-negligible reflection (e.g., a mirror), EM radiation is injected into the fiber under test, and EM radiation reflects (reflected EM radiation 128) from the mirror. The reflected EM radiation 128 is interfered with the reference EM radiation 130.

An optical field may be represented by a complex phasor:

$$u(t)=\rho(t)e^{i\phi(t)}$$

Assuming losses $\alpha_l$, $\alpha_d$ in the local oscillator and system-under-test paths, respectively, one can write these optical fields at the receiver as:

$$u_l(t)=\rho(t-\tau_l)\alpha_l e^{i\phi(t-\tau_l)}$$

$$u_d(t)=\rho(t-\tau_d)\alpha_d e^{i\phi(t-\tau_d)},$$

where $\rho(t)$ is the amplitude of the optical field and $\tau_l$ and $\tau_d$ are the optical time-of-flight delays through the local oscillator path and system-under-test path, respectively.

The two fields $u_l(t)$ and $u_d(t)$ are interfered in the receiver 140 (a complex receiver), producing an interferogram at the outputs of the optical hybrid 110. Matched detectors may be used in the receiver 140 wherein common-mode currents are subtracted. The resulting interferometric electronic signals may be digitized via the waveform acquisition unit of the control circuitry 104. The in-phase and quadrature signals may be assigned to the real and complex parts, respectively, of a complex number. The resulting signal may be given by $$U_{cplx}(t) \propto \alpha_l \alpha_d \rho(t-\tau_l)\rho(t-\tau_d)e^{i\theta(t)},$$

where $$\theta(t)=\phi(t-\tau_l)-\phi(t-\tau_d)$$

If the continuous-wave EM radiation 122 is at a fixed optical frequency, the frequency and phase evolution may be given by $$\nu(t)=\nu_0$$

$$\phi(t)=2\pi\int\nu(t)dt=2\pi\nu_0 t$$

where $\nu_0$ is the nominal, fixed optical frequency of the continuous-wave EM radiation 122. In this case, $$\theta(t)=2\pi\nu_0\Delta\tau,$$

where $$\Delta\tau=\tau_d-\tau_l.$$

Thus, the signal $U_{cplx}(t)$ is a phasor with magnitude proportional to the loss through the system under test (αd) and with phase proportional to the optical time-of-flight difference between local oscillator path and system-under-test path. This phase will traverse $2\pi$ radians when Δτ changes by an amount $1/\nu_0$. Consider an example where $\nu_0$=193.4 terahertz (THz) (1550 nanometers (nm) wavelength), the optical path length goes through substantially 5.2 femtoseconds (fs) for a complete oscillation of the phasor. Given that the dual-pass optical path length in typical optical fiber is substantially 10 ns per meter, the optical path length for one oscillation of the interferometric phasor is substantially a 0.5 μm physical path length change in an optical fiber. Also, given that the complex plane (in which the phasor resides) may be digitized to multi-bit precision, precision to on the order of 1 nm or better of equivalent physical path length change is possible by analyzing the interferometric phasor.

This example considered the case where only one non-negligible element within the system under test reflects the incident optical field. In a distributed optical sensing scenario, the system under test might include many (tens, hundreds, thousands, tens of thousands, or more) sensors written along a fiber, all of which may be uniquely demodulated (i.e., interrogated). Alternatively or in addition, the optical fiber may be any optical fiber that exhibits Rayleigh backscatter distributed along the optical fiber, which backscatter is due to random imperfections in the fiber (e.g., as a result of an imperfect manufacturing process).

As previously discussed, the modulator 112 is used to impart a real or complex modulation pattern on the incident EM radiation 124 to generate the modulated EM radiation 126 to allow a multitude of sensors or locations to be uniquely demodulated.

In some embodiments the modulation signal 138 imparted on the light via the optical modulator 112 is a pseudo-random binary sequence (PRBS). In such embodiments the optical phasor of the continuous-wave EM radiation 122 exiting the EM radiation source 102 (and on the incident EM radiation 124 provided to the modulator 112) is effectively multiplied by either +1 or −1. By way of non-limiting example, since $e^{i0}=1$ and $e^{i\pi}=-1$, this multiplication by +1 and −1, may be accomplished by a phase modulator that moves the incident optical field through either $\pi/2$ radians or $-\pi/2$ radians (or indeed any two angles separated by $\pi$ radians). In this case, the amplitude of the optical field exiting the modulator is unchanged. The phasor may be rotated about the unit circle depending on the binary number of the employed PRBS.

Also by way of non-limiting example, multiplication by +1 and −1 may be performed using a Mach-Zehnder interferometer. In such embodiments the phasor of the incident EM radiation 124 may be moved from a nominal zero-radian state to a point $\pi$ radians away by moving the phasor through the origin of the unit circle. Commercial optical modulators often implement Mach-Zehnder interferometers within the modulator and can be used for this purpose as the modulator 112. Modulation using a Mach-Zehnder interferometer would be similar to BPSK optical modulation, and a real modulator would be sufficient for this purpose. A complex modulator could also be used to impart the BPSK constellation on the incident optical field.

In some embodiments a PRBS for the modulation signal 138 may be generated via a linear feedback shift register (LFSR) in a highly efficient digital processor (e.g., CPU, FPGA, GPU, SoC, etc.). If the LFSR is constructed with a number M of bits, a maximum-length or m-sequence PRBS can be generated with maximum length $2^M-1$. This maximum-length PRBS can be imparted onto the incident EM radiation 124 via the modulator 112 and injected as the modulated EM radiation 126 into the system under test 116 (e.g., a fiber under test). As used herein, the term "chip time" refers to the time taken to progress from one sample (i.e., chip) of the PRBS to the proceeding sample. As used herein, the term "sequence time" refers to the time taken to modulate an entire (in this non-limiting example, $2^M-1$) sequence of the modulation signal 138.

It may be informative to illustrate a PRBS application to a system under test 116 having one reflector. A binary signal may be defined to result in a desired zero- or $\pi$-radian shift as $$B(t) = \frac{\pi}{2}(1 - A(t)),$$

where A(t) is a PRBS having values in the set $\{-1, +1\}$. This may be accomplished by driving a phase modulator with a signal having two voltage potential values that differ from one another by $V_\pi$, where $V_\pi$ is a voltage potential that, when applied to the modulator 112 (e.g., an optical phase modulator), results in a phase shift of $\pi$ radians.

If the optical source power $\rho(t)$ is slowly varying as compared to the sequence time, the interferometric signal may be given by $$U_{cplx}(t) \propto \alpha_d e^{i\theta(t)} e^{iB(t-\tau_d)} = \alpha_d e^{i2\pi\nu_0 \Delta\tau} e^{i\pi/2(1-A(t-\tau_d))}$$

The control circuitry 104 may digitize $U_{cplx}(t)$ (e.g., using a waveform acquisition unit), and multiply $U_{cplx}(t)$ by the pseudo-random binary sequence $A(t-\tau_d)$, yielding $$A(t-\tau_d) \cdot U_{cplx}(t) \propto \alpha_d A(t-\tau_d)^{i\pi/2(1-A(t-\tau_d))}$$

It is noted that since A(t) takes only two values (+1 and −1), $A(t)e^{i\pi/2(1-A(t))}$, reduces to unity:

$$A(t) \cdot e^{i\pi/2(1-A(t))}|_{A(t)=+1} = 1 \cdot e^{i0} = 1$$

$$A(t) \cdot e^{i\pi/2(1-A(t))}|_{A(t)=+1} = 1 \cdot e^{i\pi} = 1$$

Thus, multiplying the interferogram by the PRBS restores the signal to the desired phasor $e^{i2\pi\nu_0 \Delta\tau}$.

A PRBS exhibits a useful autocorrelation property in that the autocorrelation function is unity given a zero shift, but exhibits a small value −1/N for any other shift value, where N is the sequence length. In other words, if a PRBS is multiplied by the same PRBS with zero shift, the −1 values multiply by −1 values and the +1 values multiply by +1, and the signals are perfectly correlated. When these values are summed across one sequence time, the result is N. For any other shift, the result of the multiplication of the PRBS and the circularly shifted will result in $2^{M-1}-1$ results of the multiplication in which the product is +1, and $2^{M-1}$ results of the multiplication in which the product is −1. When these values are summed across one sequence time, the result is −1.

For the zero-shift and non-zero shift cases, these correlation values may be normalized by N to yield a unity correlation for zero shift and −1/N correlation for non-zero shift. Consequently:

$$\frac{1}{N}\sum_{k=0}^{N-1} A(t) \cdot A(t - kt_c) = \begin{vmatrix} 1; t_c = 0 \\ -\frac{1}{N}; t_c \neq 0 \end{vmatrix},$$

where $t_c$ is the chip time and $t_c = 1/f_s$, and where $f_s$ is the sample rate of the PRBS. As the sequence length N is increased, the value of the autocorrelation function for non-zero shift decreases.

If a PRBS m-sequence is continually repeated in time, a circular shift (e.g., "circshift") may not be required. A standard shift of one signal relative to another, with a single sequence time of the long signal considered in the summation, will exhibit a similar result.

Now that the case of a single reflector has been illustrated, the case of multiple reflective elements will be illustrated. It is assumed that the system under test 116 (e.g., a fiber under test) includes a number n of reflective elements (e.g., multiple reflectors, FBGs, Rayleigh scatter locations, or combinations thereof). It is also assumed that a phase modulator is used to impart the PRBS signal (the modulation signal 138) onto the incident EM radiation 124 to provide the modulated EM radiation 126 to the system under test 116. Each reflection from the system under test 116 will occur at a unique location $\tau_j$, where j=1 ... n. The n back-reflections superpose to form $$u_d(t) = \sum_{j=0}^{n-1} \alpha_{d_j} \rho(t - \tau_{d_j}) e^{iB(t-\tau_j)} e^{i\phi(t-\tau_{d_j})},$$

Given a fixed-frequency continuous-wave EM radiation 122, this field interferes to form $$U_{clpx}(t) \propto \alpha_l \rho(t - \tau_l) \sum_{j=0}^{n-1} \alpha_{d_j} \rho(t - \tau_{d_j}) e^{iB(t-\tau_j)} e^{i2\pi\nu_0 \Delta\tau_j}$$

Plus additional terms, where $\Delta\tau_j = \tau_l - t_{d_j}$. The additional terms will have components in $\alpha_{d_j} \cdot \alpha_{d_p}$, where p is the index of an additional summation over fiber-under-test terms. If the local oscillator field is much stronger than the reflected system-under-test fields (i.e., $\alpha_l \gg \alpha_d$), these additional terms will contribute negligibly to the overall interferogram. The control circuitry 104 (e.g., a processing unit of the control circuitry 104) may digitize $U_{cplx}(t)$ and multiply the pseudo-random sequence before summing over a sequence time to form $$\frac{1}{N} \sum_{k=0}^{N-1} A(t - \tau_k) \cdot U_{clpx}(t) = \sum_{j=0}^{n-1} \frac{1}{N} \sum_{k=0}^{N-1} \alpha_{d_j} A(t - \tau_k) e^{iB(t-\tau_j)} e^{i2\pi\nu_0 \Delta\tau_j},$$

where ρ(t) has been assumed to be constant over a sequence time.

Based on the above discussed correlation properties of the PRBS, $$\frac{1}{N} \sum_{k=0}^{N-1} A(t - \tau_k) e^{iB(t-\tau_j)} = \begin{cases} 1; \tau_j = \tau_k \\ -\frac{1}{N}; \tau_j \neq \tau_k \end{cases},$$

and $$\frac{1}{N} \sum_{k=0}^{N-1} A(t - \tau_k) \cdot U_{clpx}(t) \propto \alpha_k e^{i2\pi\nu_0 \Delta\tau_k} - \frac{1}{N} \sum_{j=0}^{n-1} \alpha_{d_j} e^{i2\pi\nu_0 \Delta\tau_j}.$$

As discussed above, as M increases, 1/N decreases and the influence of the second term decreases. Since $\nu_0 \Delta\tau_j$ readily traverses 2π radians due to environmental perturbations, $e^{i2\pi\nu_0\Delta\tau_j}$ for an appreciable number n of reflectors may be regarded to be approximately uniformly distributed over the unit circle, leading to further collapse of the second term of the previous equation, resulting in $$\frac{1}{N} \sum_{k=0}^{N-1} A(t - \tau_k) \cdot U_{clpx}(t) \approx \propto \alpha_k e^{i2\pi\nu_0 \Delta\tau_k}.$$

Therefore, by multiplying an m-sequence PRBS with the composite interferogram and integrating the result over a sequence time, a phasor may be recovered for any desired reflective element within the system under test 116. The desired element within the system under test 116 may be tuned by appropriately delaying the PRBS by an amount equal to the optical time-of-flight delay to the respective element.

A pseudo-random binary sequence is only one example of a host of sequences that the modulation signal source 114 may use to provide the modulation signal 138 to the modulator 112. Any signal for modulation signal 138 that exhibits substantially zero autocorrelation for any non-zero shift of the modulation signal 138 may also be used. In some embodiments the modulation signal source 114 may use a family of signals known as constant amplitude, zero autocorrelation (CAZAC) signals, as well as signals with zero autocorrelation zones (ZACZ) or regions. CAZAC sequences exhibit precisely zero autocorrelation for all non-zero shifts of the sequence. As a result, CAZAC sequences used for the modulation signal 138 may perform better than PRBSs, which have small, but non-zero autocorrelation for non-zero shift. One example of a CAZAC sequence is the Zadoff-Chu sequence. ZACZ signals have regions of contiguous delay shift in which the autocorrelation is substantially or precisely zero.

The procedure for applying any of these zero or small autocorrelation sequences to the modulation signal 138 is the same as discussed above for PRBSs. The real- or complex-valued zero-autocorrelation (or small-autocorrelation) sequence is imparted onto the substantially fixed-frequency laser light by synthesizing the signal (real or real and imaginary parts) and driving a real or complex modulator (the modulator 112) with the respective signal(s) (the modulation signal 138). The sequence is injected into the system under test 116 via the modulated EM radiation 126. The modulated EM radiation 126 experiences unique time-of-flight delays to unique reflective elements (whether FBG, Rayleigh scatter, other scattering mechanism, or other reflecting mechanism). The reflected EM radiation 128 (modulated and variably delayed EM radiation) is interfered with substantially single-frequency EM radiation (the reference EM radiation 130) to produce an interferogram 142 (i.e., interfered EM radiation). The interfered EM radiation 142 is converted to an analog electrical signal (the first measurement signal 156 and the second measurement signal 158) and then digitized to form a continuous, digitized interferogram (e.g., in a digital signal processor of the control circuitry 104).

Once the interferogram has been sampled, a time-domain approach or a frequency-domain approach may be taken. For the time-domain approach a time-shifted, complex-conjugate version of the sequence is multiplied with the interferogram. The time shift corresponds to a time-of-flight location of the system under test 116. The product is integrated over one sequence time to form a phasor. A magnitude of the phasor is proportional to a reflectivity at the location corresponding to the optical time-of-flight to the location along the system under test. The phase of the phasor varies in proportion to the optical time-of-flight location of the reflective (or scattering) element.

In a frequency-domain approach the digitized interferogram and the substantially zero-autocorrelation signal may be Fourier transformed. Either the Fourier transform of the original sequence (one period or sequence time of this signal) or of one sequence time of the interferogram is complex conjugated. An inverse Fourier transform is taken of the product of the two signals. The resulting signal is a vector of phasors. The magnitudes of the phasors in the vector are proportional to the reflectivity at the time-of-flight locations along the system under test 116. The phases of the phasors are proportional to the optical time-of-flight to the locations along the system under test 116.

Figure 2:
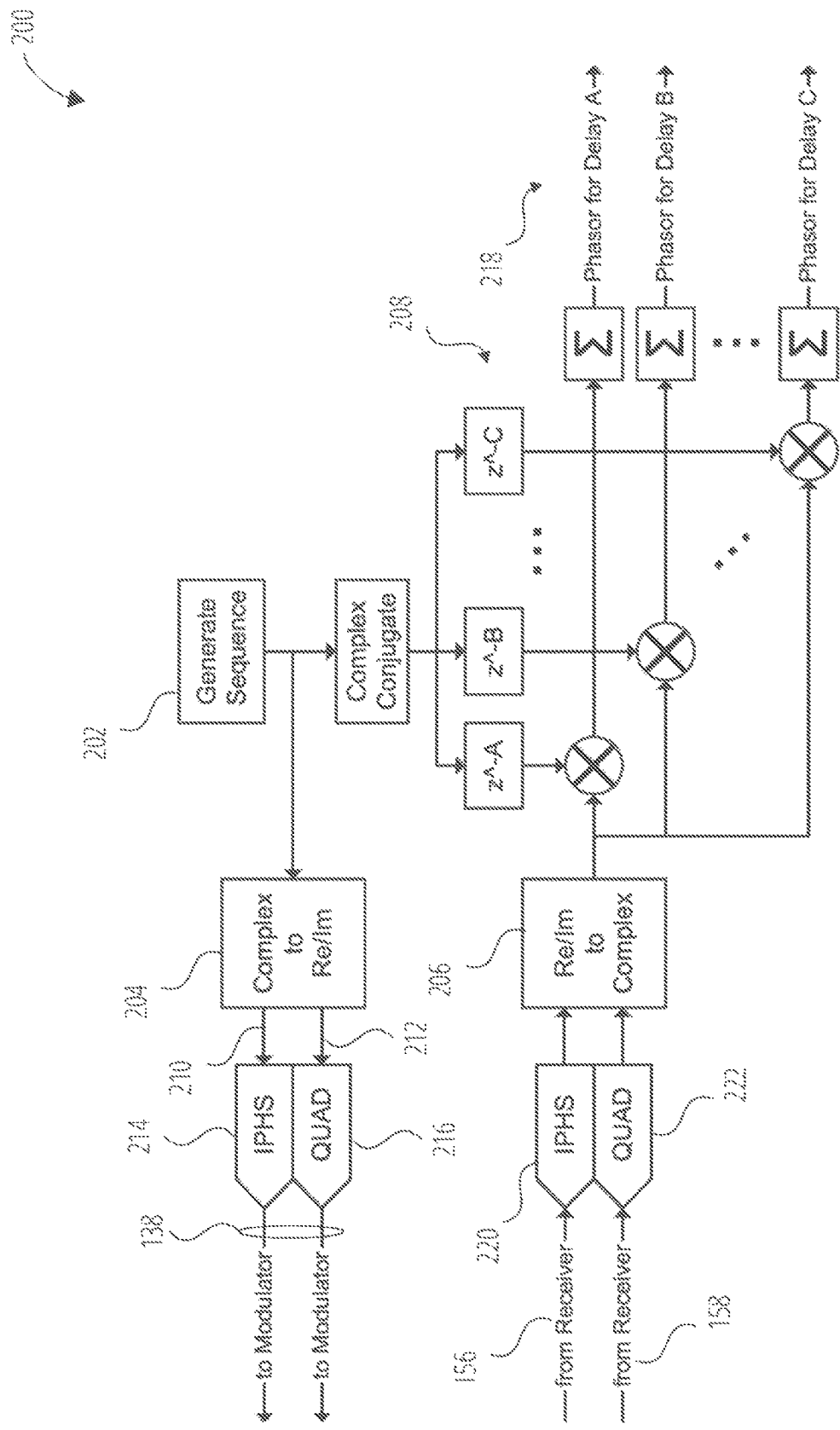
FIG. 2 is a signal processing diagram illustrating a multiplier-accumulator architecture for performing OCoDR, according to some embodiments.

FIG. 2 is a signal processing diagram illustrating a multiplier-accumulator architecture 200 for performing OCoDR, according to some embodiments. At operation 202 the multiplier-accumulator architecture 200 includes generating a sequence. By way of non-limiting example, the multiplier-accumulator architecture 200 may be implemented by the control circuitry 104 of FIG. 1. The multiplier-accumulator architecture 200 may be used to uniquely demodulate elements in the system under test 116 of FIG. 1 at specific optical time-of-flight delays.

At operation 202 the multiplier-accumulator architecture 200 includes generating a sequence (e.g., a PRBS, a zero autocorrelation sequence, a substantially zero autocorrelation sequence, a CAZAC sequence, a Zadoff Chu sequence). Values of the sequence may include real components, imaginary components, or both, according to various embodiments. The values may be provided to a delay network 208 for later use in extracting individual phasors 218 from a first measurement signal 156 and a second measurement signal 158 received from photodetector 106 and photodetector 108, respectively (FIG. 1).

At operation 204 the multiplier-accumulator architecture 200 includes converting the continuous (repeating) sequence from a continuous stream of complex numbers to real parts 210 and imaginary parts 212. At operations 214, 216, respectively, the multiplier-accumulator architecture 200 includes converting the real, imaginary parts, respectively of the sequence from a digital representation to an analog representation, for example via digital to analog converter (s). The real parts 210 may be communicated as an in-phase component of the modulation signal 138 and the imaginary parts 212 may be communicated as a quadrature component of the modulation signal 138. As previously discussed, the modulation signal 138 is provided to the modulator 112, which modulates incident EM radiation 124 to produce modulated EM radiation 126, and the modulated EM radiation 126 is provided to the system under test 116 (FIG. 1). In response, reflected EM radiation 128 is received from the system under test 116 and interfered with a reference EM radiation 130, and interfered EM radiation 142 is converted by the photodetector 106 and the photodetector 108 to provide the first measurement signal 156 and second measurement signal 158 (FIG. 1). The first measurement signal 156 and the second measurement signal 158, which includes an in-phase component and a quadrature component, respectively, are converted from analog to digital representation at operations 220, 222, respectively, for example via digital to analog converter(s). At operation 206 the multiplier-accumulator architecture 200 includes converting the in-phase component (e.g., a real component) and the quadrature component (e.g., an imaginary component) of the continuous interferogram to a continuous stream of complex numbers. The complex number stream is then multiplied by the delayed values of the conjugate of the sequence (assuming a complex sequence, though a real sequence would not use a complex conjugate, or a complex conjugate of a real sequence would just be the same real sequence), which values were provided at operation 202 (generating a sequence). For a PRBS a multiplier may simplify to an operation mode input to an accumulator. The products of the complex number and the delayed, conjugated values of the sequence are summed over a sequence time to produce individual phasors 218 for each of the delays of the delay network 208. Alternatively, if the conjugate of the complex sequence is taken and sent to operation 204, then native values (i.e., non-conjugated values) may be fed to the delay network 208.

A PRBS may be applied to a composite signal by feeding the PRBS signal into an operation-mode input of an accumulator, resetting the accumulator every N operational cycles, and taking the answer on the operational cycle preceding the reset. The binary point of the answer may then be shifted left by M bits to approximately divide the answer by N.

Figure 3:
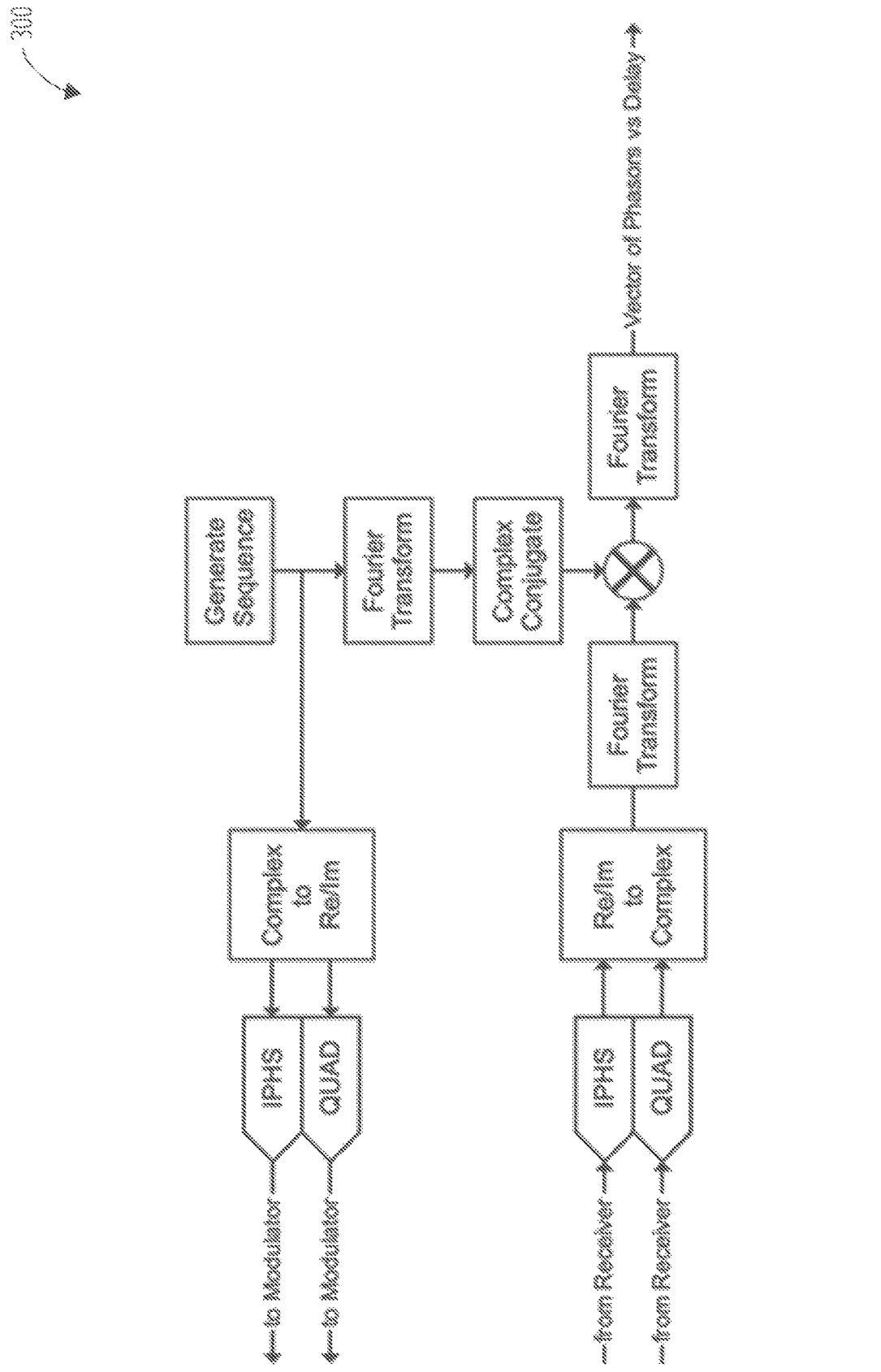
FIG. 3 is a signal processing diagram illustrating a frequency domain architecture for performing OCoDR, according to some embodiments.

FIG. 3 is a signal processing diagram illustrating a frequency domain architecture 300 for performing OCoDR, according to some embodiments. For a large n, complexity in the digital signal processing implementation may be improved by applying a pseudo-random sequence in the frequency domain (e.g., a Fourier-transform domain). This may be accomplished by taking a Fourier transform of the pseudo-random sequence (e.g., optionally storing the Fourier transform of the pseudo-random sequence). For each sequence time the interferometric signal output from the receiver 140 (FIG. 1) may be acquired and digitized, a Fourier transform of the interferogram may be taken, the Fourier transform of the interferogram may be multiplied by the Fourier transform of the zero- (or substantially zero- or small-) autocorrelation sequence (where either the Fourier transform of the sequence or the Fourier transform of the interferogram has been complex-conjugated), and an inverse Fourier transform may be taken of the result.

These operations may result in a vector of phasors. Each phasor may yield the amplitude and phase of the element at that respective time-of-flight delay along the system under test 116 (FIG. 1) (e.g., a fiber). A circular cross-correlation of the sequence with the interferogram may be returned. Since the sequence is a repetitive signal with repetition length equal to the sequence length, a circular shift of a single repetition length of the sequence is the same as a linear shift in the repetitive sequence stream. As a result, a circular cross-correlation will yield the same result as individual application of the appropriately-delayed sequence(s) to the interferogram. This results in an algorithm with complexity $\Omega N \log N$. In cases where $\log_2 N < n$, this may result in a more efficient implementation.

If phasors are recovered for every delay k=0 . . . N−1, the frequency domain architecture 300 equates to a circular convolution of the sequence with the interferogram. Circular convolution in the time domain may be implemented via multiplication in the frequency domain.

In some embodiments a complex conjugate may be taken of the complex signal from the receiver instead of taking the complex conjugate of the sequence.

Figure 4:
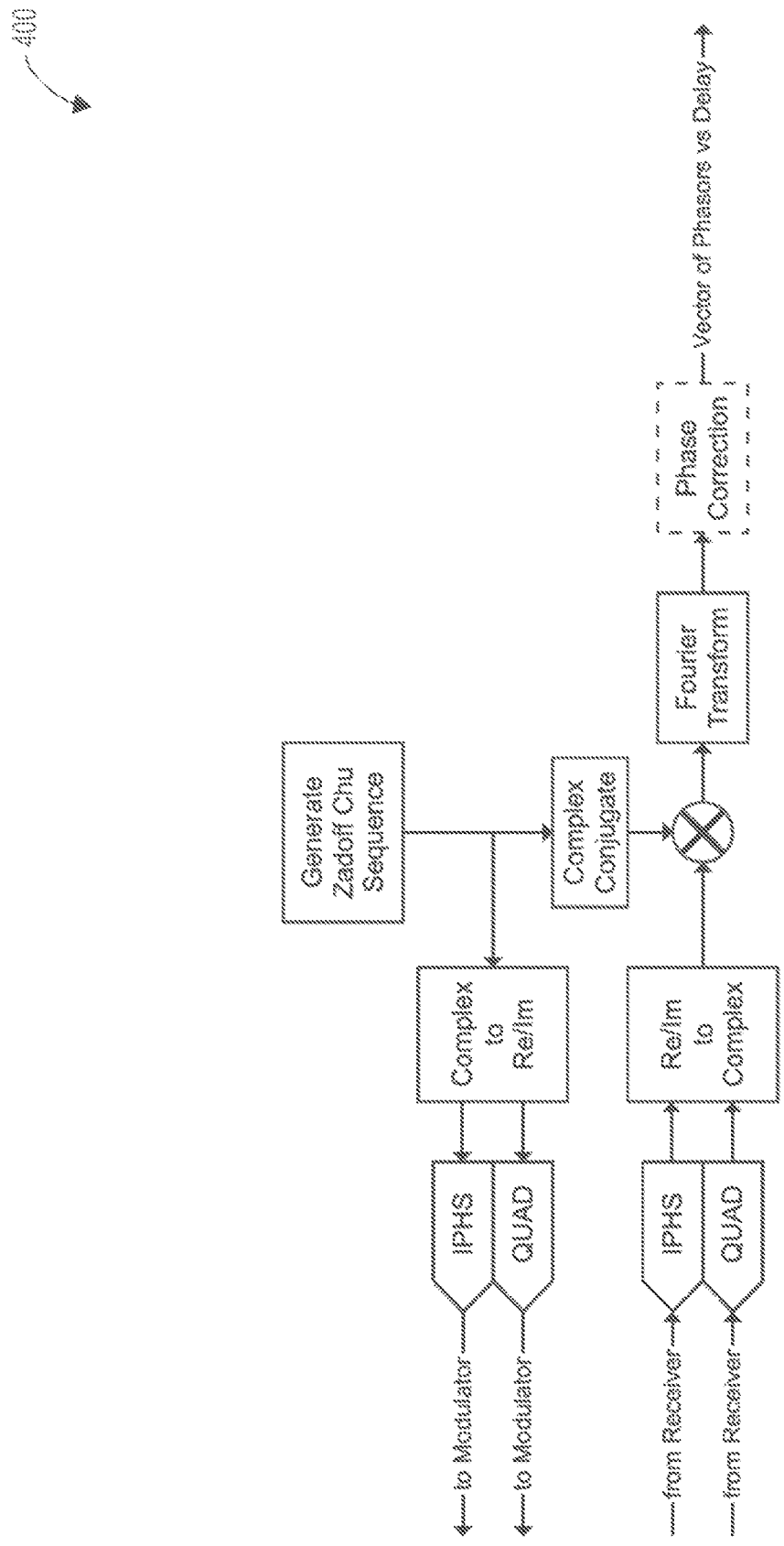
FIG. 4 is a digital signal processing diagram illustrating a Zadoff-Chu sequence architecture for performing OCoDR, according to some embodiments.

FIG. 4 is a digital signal processing diagram illustrating a Zadoff-Chu sequence architecture 400 for performing OCoDR, according to some embodiments. An r-th root Zadoff-Chu sequence of arbitrary length may be generated (e.g., by the modulation signal source 114 (FIG. 1)). The Zadoff-Chu sequence may be transmitted (e.g., by the modulation signal source 114) to the modulator (e.g., the modulator 112 of FIG. 1) via a waveform synthesis subsystem. A complex signal (interferogram) that is a superposition of modulated, back-reflected phasors may be received (e.g., at the control circuitry 104) from the system under test 116 (FIG. 1) (e.g., a fiber).

In some embodiments a complex conjugate may be taken of either the sequence or the interferogram. In some embodiments the complex conjugate of the sequence could be sent to the waveform synthesis module and no complex conjugate may be taken of the sequence nor interferogram before complex multiply and Fourier transform. Complex multiplication of the sequence and the interferogram may be performed, and a Fourier transform of the product may be taken. The result is a vector of phasors. The linear in optical time-of-flight delay may be determined for a given one of the vector of phasors. The magnitude of a phasor is proportional to the reflectivity at that optical time-of-flight delay along the system under test 116. The phase of a phasor is proportional to the optical time-of-flight delay along the system under test 116.

When signal processing is performed according to the Zadoff-Chu sequence architecture 400, a Fourier transform of a conjugate Zadoff-Chu sequence multiplied to the interferogram may be taken. The conjugate Zadoff-Chu multiplication sets up a Fourier series. Phase offsets in this series may be taken into consideration if the phase of multiple samples of the Fourier series is to be analyzed.

A Zadoff-Chu sequence may be calculated as $$z[k] = e^{-i\pi \frac{rk(k+t_f+2q)}{N}},$$

where N is the sequence length, $c_f = \text{mod}(N,2)$, $q \in \mathbb{Z}$ imparts a cyclic shift on the zero-shift (e.g., Zadoff-Chu) sequence, and $r \in \mathbb{Z}$ defines the sequence as being an rth-root sequence.

Defining $k=1$ when $t=1/f$, yields $k=tf_s$. Therefore, the Zadoff-Chu sequence may be represented in continuous time as $$z(t) = e^{-i\pi \frac{r}{N} f_s^2 t^2} e^{-i\pi \frac{r}{N}(c_f+2q) f_s t}.$$

This Zadoff-Chu sequence may be delayed by $\tau$ and multiplied by a conjugated z(t) to become $$z^*(t) \cdot z(t-\tau) = e^{i2\pi \frac{r f_s^2}{N} \tau t} e^{i\pi \frac{r}{N} \tau f_s (c_f+2q-\tau f_s)},$$

which when discretized becomes $$z^*[k] \cdot z[k - \tau f_s] = e^{i2\pi \left(k+q-\frac{c_f}{2}\right)\frac{r}{N} \tau f_s} e^{i\pi \frac{r}{N} \tau^2 f_s^2}.$$

The discrete-time index k may increment by 1. The term $$\left(k + q - \frac{c_f}{2}\right)\frac{r}{N}$$

may be notable because q acts as a shift to the Fourier series just as q acted as a shift to the sequence. The term $c_f$ is either zero (even sequence) or one (odd sequence), which implies a half-sample shift for an odd sequence length.

A phase increment per sample of 2 π may occur at $$\frac{r}{N} \tau f_s = 1 \text{ or } \tau = \frac{N}{f_s} \text{ if } r = 1.$$

Thus, if there are N samples in a Zadoff-Chu sequence with a sample rate $f_s$, there are N positions within the Fourier transform, and the spatial resolution in the delay domain is $1/f_s$. For no shift and an even, first-root sequence (i.e., $q=c_f=0$; $r=1$), $$z^*[k] \cdot z[k - \tau f_s] = e^{i2\pi \frac{k}{N} \tau f_s} e^{i\pi \frac{\tau^2 f_s^2}{N}}.$$

The phase increment per index is the second term of this equation. It has already been established that τ for each sample increments by 1/fs.

A local oscillator field may be given by $$u_l = \rho 9 t - \tau_l) \alpha_l e^{-i\phi(t-\tau_l)}.$$

A modulated DUT field reflected (or scattered) from a single reflector (scattering center) of the system under test may be given by $$u_d = \rho(t-\tau_d)\alpha_d(\tau_d) e^{-i\phi(t-\tau_d)} e^{-i\zeta(t-\tau_d)},$$

where Zadoff-Chu sequence z(t) (defined as $z(t)=e^{-i\zeta(t)}$) is imparted via the modulator 112 on the incident EM radiation 124 forming modulated EM radiation 126.

The interferogram at 156 is given by $$U_{re}(t,\tau_d) \propto \rho(t-\tau_d)\alpha_d(\tau_d)\cos(\phi(t-\tau_d)-\phi(t-\tau_d)-\zeta(t-\tau_d))$$

and the interferogram at 158 given by $$U_{im}(t,\tau_d) \propto \rho(t-\tau_d)\alpha_d(\tau_d)\sin(\phi(t-\tau_d)-\phi(t-\tau_d)-\zeta(t-\tau_d))$$

The function $U_{cplx}$ may be given as $$U_{cplx}(t,\tau_d) = U_i(t,\tau_d) + iU_q(t,\tau_d) \propto \rho(t-\tau_d)\alpha_l\rho(t-\tau_d\alpha_d(\tau_d)$$
$$e^{i\theta_d(t,\tau_d)}$$

where $$\theta_d(t,\tau_d) = \phi(t-\tau_d) - \phi(t-\tau_d) - \zeta(t-\tau_d).$$

A fixed-frequency laser may be modeled as exhibiting phase $$\phi(t) = 2\pi v_o t$$

yielding $$\theta_d(t,\tau_d) = -2\pi v_o \tau_l + 2\pi v_o \tau_d - \zeta(t-\tau_d).$$

A conjugate Zadoff Chu sequence can then applied to the interferogram yielding $$z^*(t) \cdot U_{cplx}(t,\tau_d)$$

$$\propto \rho(t-\tau_l)\alpha_l e^{-i2\pi v_o \tau_l} \cdot \rho(t-\tau_d)\alpha_d(\tau_d) e^{i2\pi \frac{r f_s^2}{N} \tau_d t} e^{i2\pi v_o \tau_d} e^{i\pi \frac{r}{N} \tau_d f_s (c_f+2q-\tau_d f_s)}$$

It may also be assumed that the laser power is constant over a sequence length such that $\rho(t)=\rho$.

$$z^*(t) \cdot U_{cplx}(t, \tau_d) \propto \rho^2 \alpha_l e^{-i2\pi v_o \tau_l} \cdot \alpha_d(\tau_d) e^{i2\pi \frac{r f_s^2}{N} \tau_d t} e^{i\pi \frac{r}{N} \tau_d f_s (c_f+2q-\tau_d f_s)} e^{i2\pi v_o \tau_d}$$

The above includes terms in $\tau_l$ on the left and $\tau_d$ on the right. The desired phasor $e^{i2\pi v_o \tau_d}$ is multiplied with an additional phasor $$e^{i2\pi \frac{rf_s^2}{N}\tau_{d^l}}$$

with phase trajectory linear in time and proportional to $\tau_d$. In the Fourier transform domain, this is equivalent to assigning the desired phasor $e^{i2\pi v_o \tau_d}$ to a frequency proportional to the time-of-flight delay $\tau_d$.

If the system under test contains many reflectors (or scattering centers, etc.), each phasor $\tau_{d_j}$ will be multiplied by a complex exponential with frequency proportional to $\tau_{d_j}$. Thus, $z^*(t) \cdot U_{cplx}(t, \tau_d)$ sets up a Fourier series in $\tau_d$. A Fourier transform can then be taken to generate a vector of phasors $$\mathcal{F}\{z^*(t) \cdot U_{cplx}(t, \tau_d)\} \propto \alpha_l e^{-i2\pi v_o \tau_l} \alpha_d(\tau_d) e^{i2\pi v_o \tau_d} e^{-i\pi \frac{m^2}{rN}} e^{i\pi \frac{m}{N}(c_f + 2q)}$$

where index m runs from 0 to N−1. An alternate representation of $\alpha_d(\tau_d)$ is $$\alpha_d\left(\frac{m}{rf_s}\right).$$

Thus, the Fourier transform yields a vector of amplitudes $\alpha_d(\tau_d)$ and phasors $e^{i2\pi v_o \tau_d}$ at locations $m/rf_s$. The entire result is scaled by the loss through the local oscillator path $\alpha_l$ and is offset in phase by the phase through the local oscillator path proportional to the local oscillator path time-of-flight delay $\tau_l$.

Fourier-transform terms may be brought into the same phase reference by multiplying the Fourier transform output by $$e^{i\pi \frac{m^2}{rN}} e^{-i\pi \frac{m}{N}(c_f + 2q)}; m = 0 \ldots N-1$$

to eliminate the final term, resulting in $$\mathcal{F}\{z^*(t) \cdot U_{cplx}(t, \tau_d)\} e^{i\pi \frac{m^2}{rN}} e^{-i\pi \frac{m}{N}(c_f + 2q)} \propto \alpha_d(\tau_d) e^{i2\pi v_o \tau_d}.$$

Optionally, the Zadoff-Chu sequence architecture 400 may include phase correction of the vector of phasors vs. delay. By way of non-limiting example, the phase correction may include multiplication by the final phase term in the above mathematical treatment.

FIG. 5, FIG. 6, FIG. 7, FIG. 8, and FIG. 9 are plots illustrating an example of an application of a Zadoff Chu sequence.

Figure 5:
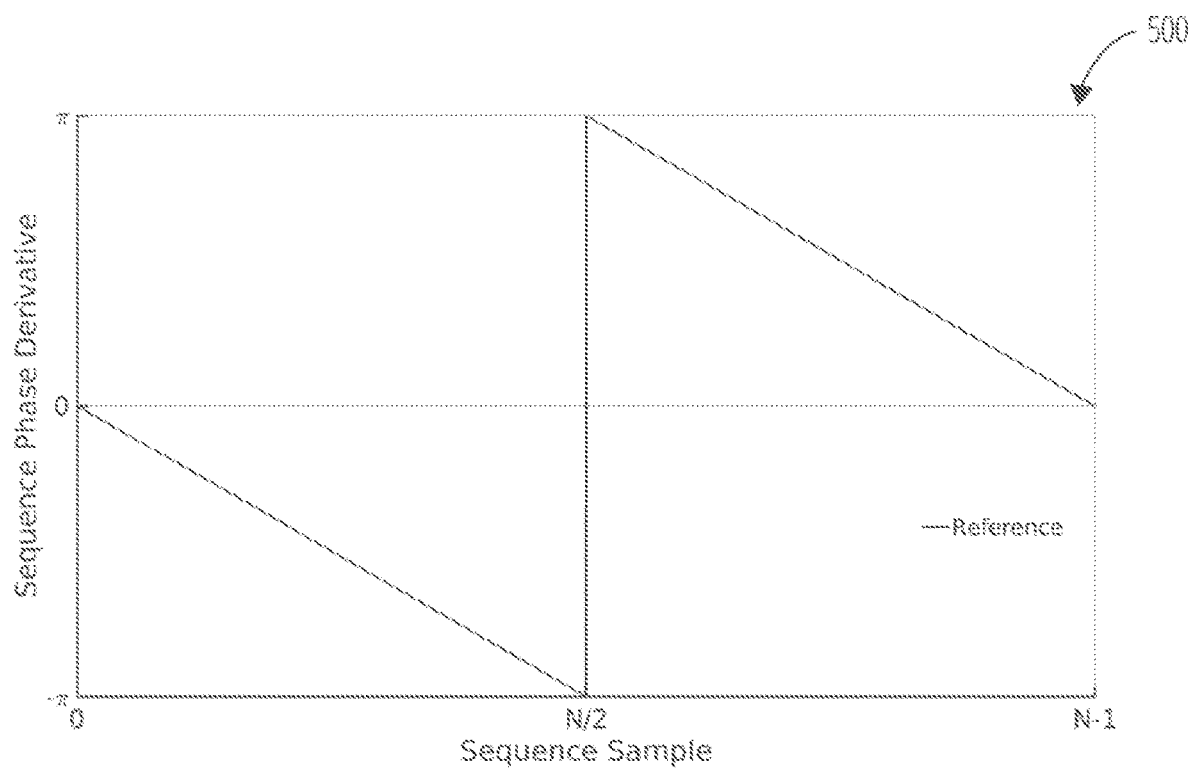
FIG. 5 is a plot illustrating an example of a phase derivative of a first-root, zero-shift Zadoff-Chu digital sequence.

FIG. 5 is a plot illustrating an example of a phase derivative 500 of a first-root, zero-shift Zadoff Chu digital sequence. This Zadoff Chu sequence has been configured to begin at zero phase derivative (i.e., zero frequency) and progress through negative frequencies to negative Nyquist (at a phase derivative of −π), then wrap to positive Nyquist before proceeding linearly to zero frequency. This digital Zadoff Chu sequence follows the definition given above, i.e., $$z[k] = e^{-i\pi \frac{rk(k + c_f + 2q)}{N}},$$

where $c_f$=0, r=1, and q=0. Other choices for N, $c_f$, r, and q may be chosen. For example, since when using a Zadoff Chu sequence for OCoDR the length domain is mapped to frequency, for a given sample rate $f_s$, N could be increased to increase sensing length, or N may be decreased to increase output sample rate of the system (i.e., repetition rate of the Fourier transform of Zadoff-Chu sequence architecture 400).

Figure 6:
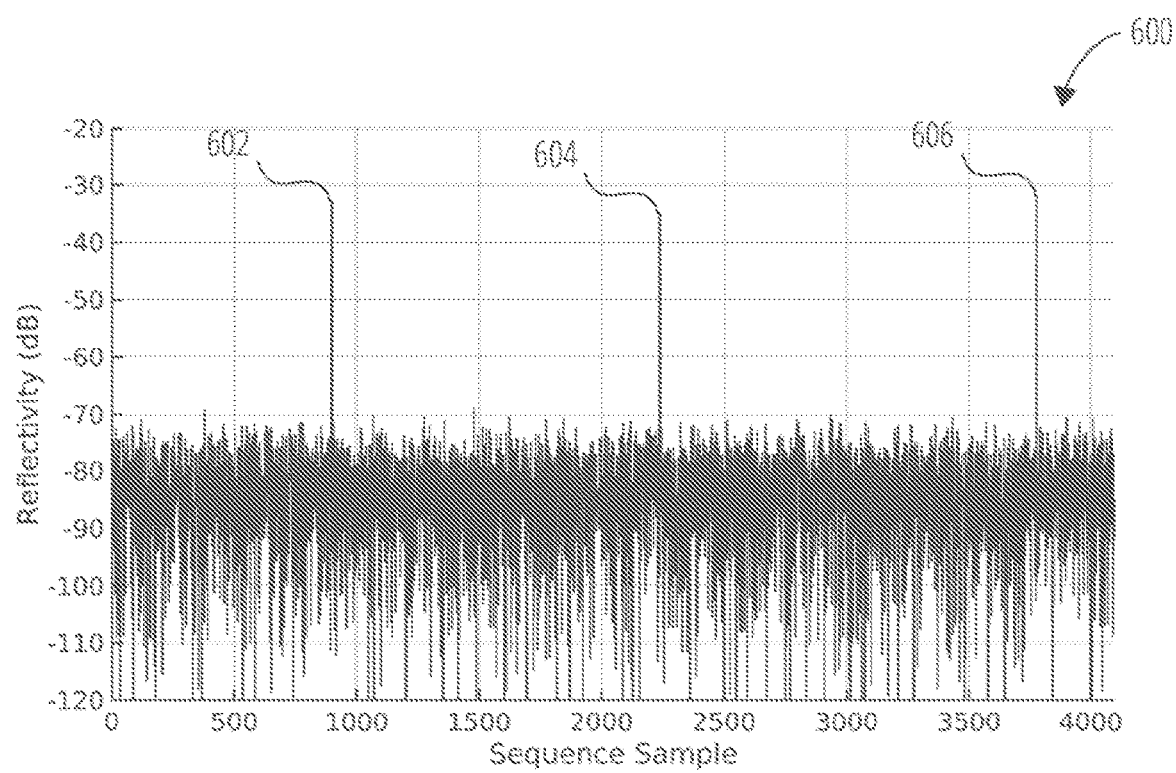
FIG. 6 is a plot illustrating a reflectivity of an example of a synthesized system under test.

FIG. 6 is a plot illustrating a reflectivity 600 of an example of a synthesized system under test. The synthesized system under test includes three reflective features (first reflector 602, second reflector 604, and third reflector 606) with reflectivity approx. −35 dB among scatter at a level of substantially −75 dB. The horizontal axis is depicted in sequence samples, where a non-limiting example sequence length 4096 is shown. If, for example, the sample rate of the digital Zadoff Chu sequence sent to a digital to analog converter and on to the modulator was $f_s$=200 MHz, each sequence sample would represent an optical time-of-flight delay of $1/f_s$=5 ns, which approximately corresponds to 0.5 meter in a glass optical fiber. The example of FIG. 6 shows reflectors 602, 604, and 606 at sequence sample locations 897, 2237, and 3779 corresponding roughly to 448.5, 1118.5, 1889.5 meters, respectively, along a fiber under test. Other scatter events are depicted along the fiber at a much lower reflectivity. The choice N=4096 in the example of $f_s$=200 MHz yields an OCoDR system with a 2048-meter addressable sensing length. If a longer fiber is connected to the OCoDR system, the portion of fiber longer than 2048 meters will wrap to zero meters and alias into the 2048-meter capability of the system. N in this case may be increased to accommodate the fiber length. Note that N=4096, $f_s$=200 MHz will yield an output sample rate (for all N locations along the fiber under test) of $f_s/N$, which in this example is substantially 48.8 kHz. Consequently, increasing N increases the sensing length but decreases the output sample rate; vice versa for a decrease in N.

Figure 7:
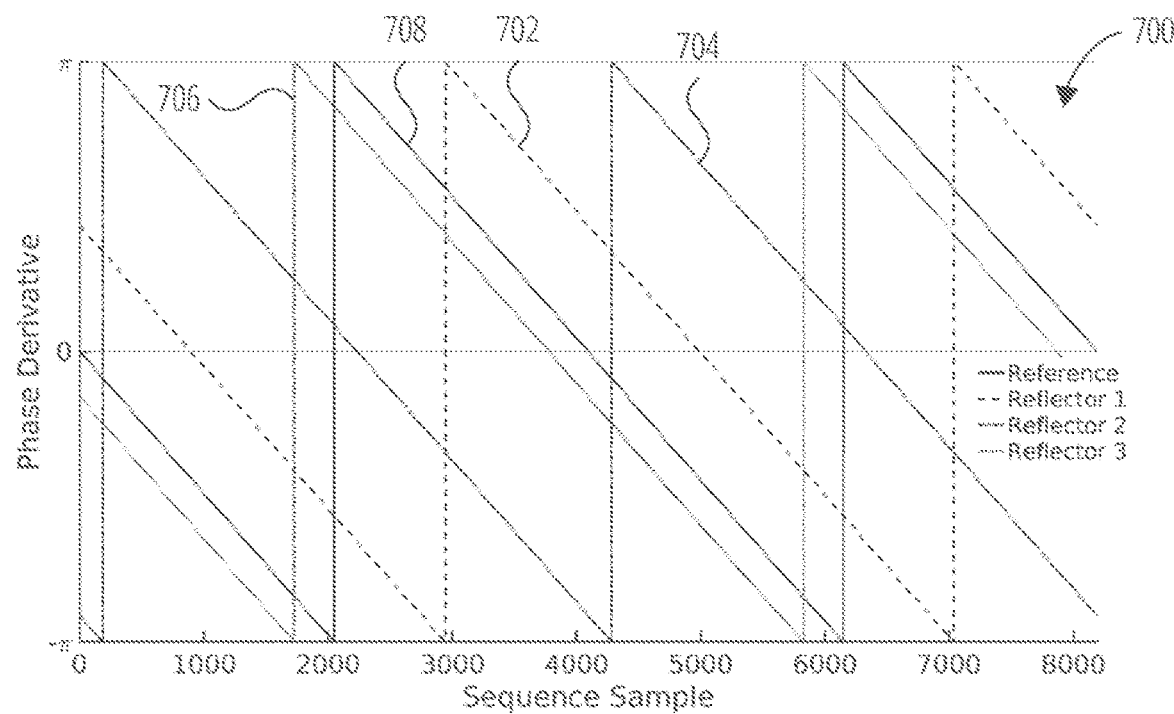
FIG. 7 is a plot illustrating phase derivatives for the reflectors of FIG. 6.

FIG. 7 is a plot illustrating phase derivatives 700 for the reflectors (first reflector 602, second reflector 604, and third reflector 606) of FIG. 6. The phase derivatives include a first phase derivative 702 corresponding to the first reflector 602, a second phase derivative 704 corresponding to the second reflector 604, and a third phase derivative 706 corresponding to the third reflector 606. The phase derivatives 700 also include a reference phase derivative 708 corresponding to zero delay.

The 448.5, 1118.5, 1889.5 meter locations of the three example reflectors 602, 604, and 606 result in a delay in the digital Zadoff Chu sequence of 897, 2237, 3779 samples, respectively. These signals are depicted graphically in FIG. 7 where the reference derivative 708 corresponding to the original sequence of modulation signal 138 (i.e., that was sent to the modulator is also included for reference) is depicted as a solid black line. This depiction extends over two sequence lengths to demonstrate how the first phase derivative 702, the second phase derivative 704, and the third phase derivative 706 are 897-, 2237-, 3779-sample delayed copies of the reference phase derivative 708. Not shown are phase derivatives of other features with non-negligible reflectivity depicted in FIG. 6 (i.e., corresponding to those reflectors with lower magnitude than the three example primary reflectors of much higher reflectivity).

Note that this depiction assumes that the Zadoff Chu sequence of modulation signal 138 was output prior to that sample denoted zero in the figure such that delayed reflectors were already sourced with the modulated sequence prior to sample zero. Though FIG. 7 only shows two sequence lengths of the continuous, repeating Zadoff Chu sequence, it is to be understood that the Zadoff Chu sequence is used to modulate the substantially fixed-frequency incident radiation 124 (FIG. 1) on a continuous basis via repeating sequences without interruption.

Figure 8:
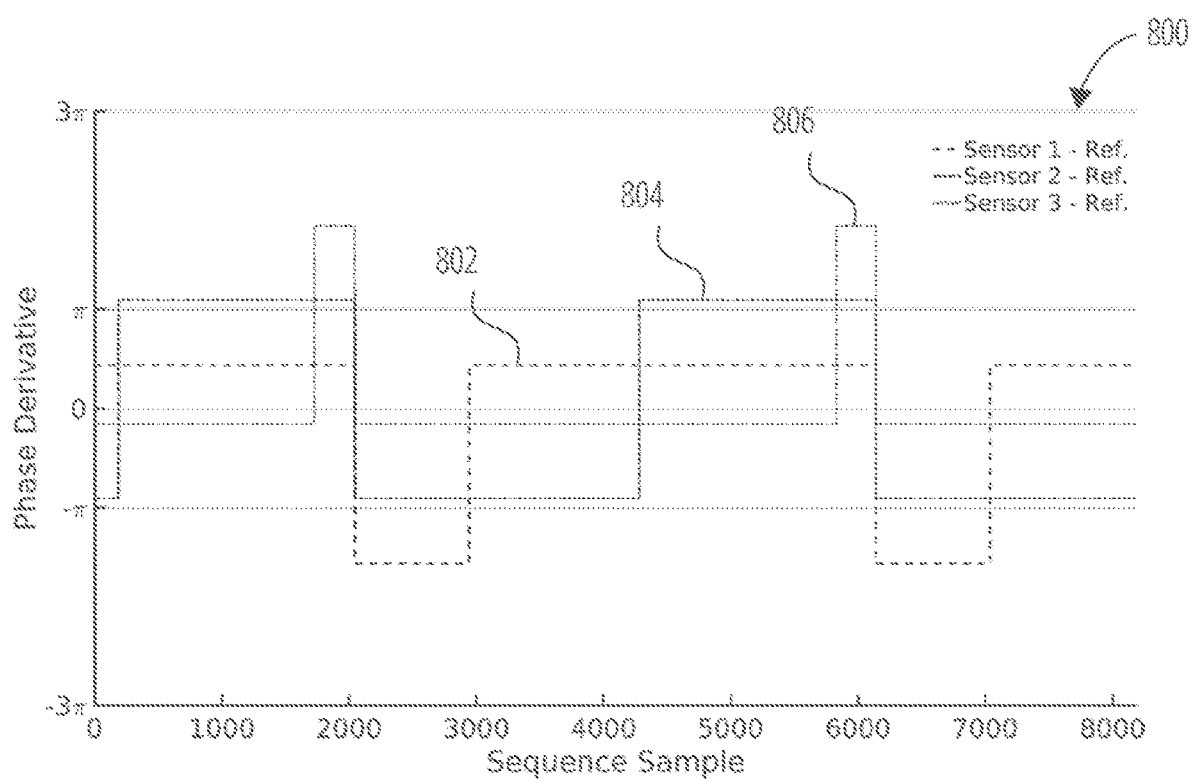
FIG. 8 is a plot of phase derivatives of the reflector signals (the phase derivatives of FIG. 7) after digitization of the interferogram with an analog digital converter and multiplication of the interferogram with the complex conjugate of the original Zadoff Chu sequence that was also sent to the modulator and before the effects of digital sampling of the signals are fully considered.

FIG. 8 is a plot of phase derivatives 800 of the reflector signals (the phase derivatives 700 of FIG. 7) after multiplication of the interferogram with the complex conjugate of the original Zadoff Chu sequence that was also sent to the modulator, and before full consideration of the frequency wrapping effect accomplished by the Nyquist sampling theorem. The phase derivatives 800 include a first phase derivative 802 corresponding to the first phase derivative 702 of FIG. 7, a second phase derivative 804 corresponding to the second phase derivative 704 of FIG. 7, and a third phase derivative 806 corresponding to the third phase derivative 706 of FIG. 7.

Complex conjugation and multiplication with the original Zadoff Chu sequence has the effect of taking the vertical difference between phase derivatives shown in FIG. 7. For example, a difference between the first phase derivative 702 and the reference derivative 708 of FIG. 7 may be observed in the long-dotted line (the first derivative 802) of FIG. 8, a difference between the second phase derivative 704 and the reference phase derivative 708 may be observed in the dash-dot line (the second derivative 804), and a difference between the third phase derivative 706 and the third reference derivative 708 may be observed in the short-dotted line (the third reference derivative 806). In some instances in time (sequence samples), the reflector trace in FIG. 7 lies above the reference (solid-line) trace. Corresponding times in FIG. 8 may show a positive, constant phase derivative (i.e., positive frequency). At other times, the reflector trace in FIG. 7 lies below the reference trace; corresponding sample numbers in FIG. 8 may exhibit a negative, constant frequency (i.e., phase derivative).

Figure 9:
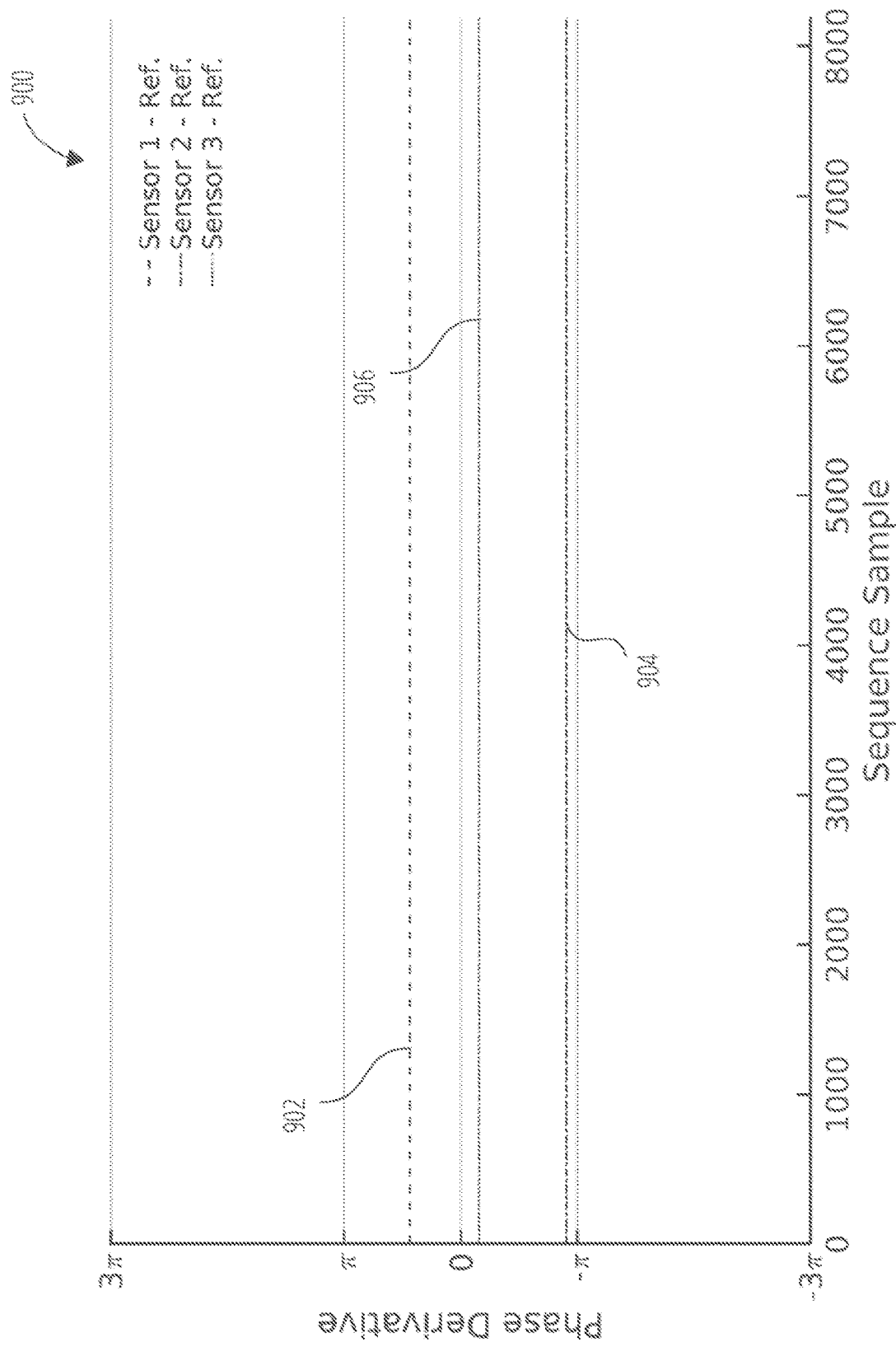
FIG. 9 is a plot illustrating phase derivatives (frequencies) arising from the three example reflectors after the effects of digital sampling of the signals are fully considered.

FIG. 9 is a plot illustrating phase derivatives 900 (frequencies) arising from the three example reflectors (the first reflector 602, the second reflector 604, and the third reflector 606 of FIG. 6) after full consideration of the frequency wrapping effect accomplished by the Nyquist sampling theorem. The phase derivatives 900 include a first phase derivative 902 corresponding to the first reflector 602, a second phase derivative 904 corresponding to the second reflector 604, and a third phase derivative 906 corresponding to the third reflector 606.

Positive Nyquist frequency $f_{nyq}$ corresponds to a phase derivative of $\pi$ radians whereas negative Nyquist $-f_{nyq}$ corresponds to $-\pi$ radians. When the conjugation and multiplication of Zadoff-Chu sequence architecture 400 is carried out, each reflector may be encoded at one of two phase derivatives (frequencies) at different times during a sequence time, one within the range $-\pi$ to $+\pi$ radians and another outside the range $-\pi$ to $+\pi$ C radians. Correct choice of digital sampling or resampling prior to multiplication with the conjugated sequence allows the resultant frequency components outside the range $-\pi$ to $+\pi$ radians to alias to within the range $-\pi$ to $+\pi$ radians upon multiplication with the sequence. The aliasing operation can be visualized by conceptually "wrapping" the range $-\pi$ to $+\pi$ radians from FIG. 7 into a conceptual "tube" such that $-\pi$ radians matches $+\pi$ radians. If the wrapping continues to the other ranges ($-3$ $\pi$ to $-\pi$ and $+\pi$ to $+3$ $\pi$) to the same $-\pi$ to $+\pi$ range, a given frequency outside the range $-\pi$ to $+\pi$ arising from a given reflector aliases to the same frequency arising from the reflector that at other times was in the range $-\pi$ to $+\pi$.

Consequently, upon digitization via an analog digital converter at (or resampling of a signal with an originally higher sample rate down to) a sample rate equivalent to the sequence bandwidth and application of the conjugate sequence, all frequencies outside the range $-\pi$ to $+\pi$ alias to their counterparts inside the range $-\pi$ to $+\pi$ as shown in FIG. 9 and each location within the system under test corresponds to a single frequency for all time in the resultant signal. A Fourier transform may then be taken (as shown in Zadoff-Chu sequence architecture 400) to recover phasors for each location along a system under test that encode reflectivity of and optical time-of-flight to the given reflector (or scattering center, or sensor, etc.). The magnitude trace of a Fourier transform in this example would appear as in FIG. 6.

A Zadoff Chu sequence of arbitrary length N may be chosen. A Fourier transform of length N might be chosen, though any length may be utilized. There is also no requirement with respect to the start or end location (relative to the applied Zadoff Chu sequence) of the data to be Fourier-transformed. Indeed, the subject disclosure sets up a continuous Fourier series in time allowing the system under test to continuously be irradiated and interrogated without interruption, as opposed to OTDR or OFDR techniques in which pulses or individual sweeps may be utilized. Consequently, for a given laser power a greater number of photons are injected into the system under test and a greater number of photons are reflected from the system under test and integrated in the photodetector of the receiver, leading to enhanced SNR, longer sensing length, and/or improved output sample rate, among other advantages. The Fourier transform length may be chosen to trade off sample rate for spatial resolution. Choosing a Fourier transform length shorter than the sequence length, for example, results in a system sample rate faster than the inverse of the optical time-of-flight delay to the farthest location along a system under test, but compromises spatial resolution relative to the maximum spatial resolution corresponding to the inverse of the sequence bandwidth.

The above treatment assumed baseband sequence modulation and reception in that the local oscillator light is modulated with an electronic modulator input signal having a bandwidth centered substantially at DC (i.e., 0 Hz). When this signal is reflected from the system under test and interfered with the local oscillator light, the resulting electronic interferogram exhibits a band substantially centered at DC (i.e., baseband). A complex receiver incorporating an optical hybrid can be used to interfere the reflected light from the system under test with in-phase and quadrature local oscillator light to create a complex interferogram from which phasors for each location along the system under test can be inferred.

The sequence need not be centered at DC. The sequence can be mixed away from DC using either a real or complex sinusoid. Some embodiments include a scenario in which a sequence is mixed away from DC using a real modulator. In such embodiments, two bands may result due to a real mixing sinusoid, as will be discussed with reference to FIG. 12; a sinusoidal amplitude envelope may be used to demonstrate an orientation of the signal and not to make any representation as to the spectral content of the various sequences that can be used.

Figure 10:
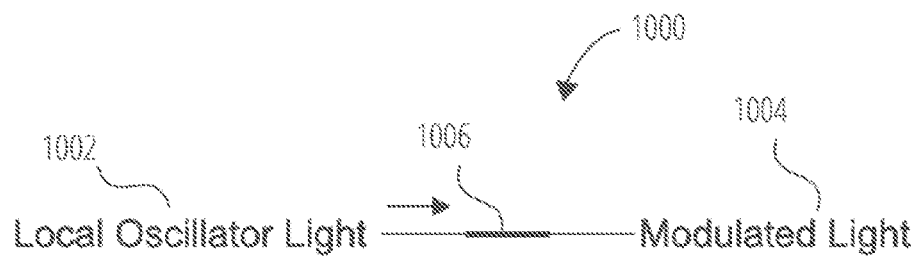
FIG. 10 is a representation of a simple phase modulator, according to some embodiments.

FIG. 10 is a representation of a simple phase modulator 1000, according to some embodiments. The simple phase modulator 1000 is an example of the modulator 112 of FIG. 1. The simple phase modulator 1000 is configured to receive local oscillator light 1002 and provide modulated light 1004 responsive to the local oscillator light. The simple phase modulator 1000 includes a waveguide 1006 that is manipulated (e.g., via a tunable electric field) to produce a tunable optical time-of-flight delay. By way of non-limiting example, the electronic drive waveform effecting the tunable optical time-of-flight delay may be created in a digital processor, synthesized via a digital to analog converter, and be conditioned by analog electronics before being fed to the simple phase modulator 1000.

Figure 11:
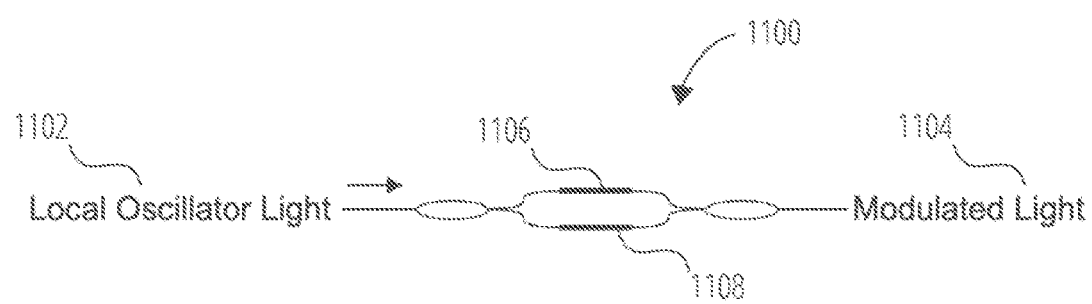
FIG. 11 is a representation of a real modulator (e.g., a Mach-Zehnder modulator, without limitation), according to some embodiments.

FIG. 11 is a representation of a real modulator 1100 (e.g., a Mach-Zehnder modulator, without limitation), according to some embodiments. The real modulator 1100 is an example of the modulator 112 of FIG. 1. The real modulator 1100 is configured to receive local oscillator light 1102 and provide modulated light 1104 responsive to the local oscillator light 1102. The real modulator 1100 is configured to split the input light into two paths, each path experiencing a tunable optical time-of-flight delay. Two electronic modulator drive waveforms 1106, 1108 may be configured to effect a static optical time-of-flight delay in both branches given a nominal offset potential or current. If the modulator waveforms are then configured to effect perturbations from this DC optical time-of-flight delay in a push-pull configuration (i.e., one perturbation is the negative of the other), a real modulator 1100 is formed. Such a real modulator 1100 may be used to mix a baseband sequence to the representation shown as a received waveform 1202 of FIG. 12, where the sequence band is seen to be mixed to both positive and negative frequencies.

Figure 12:
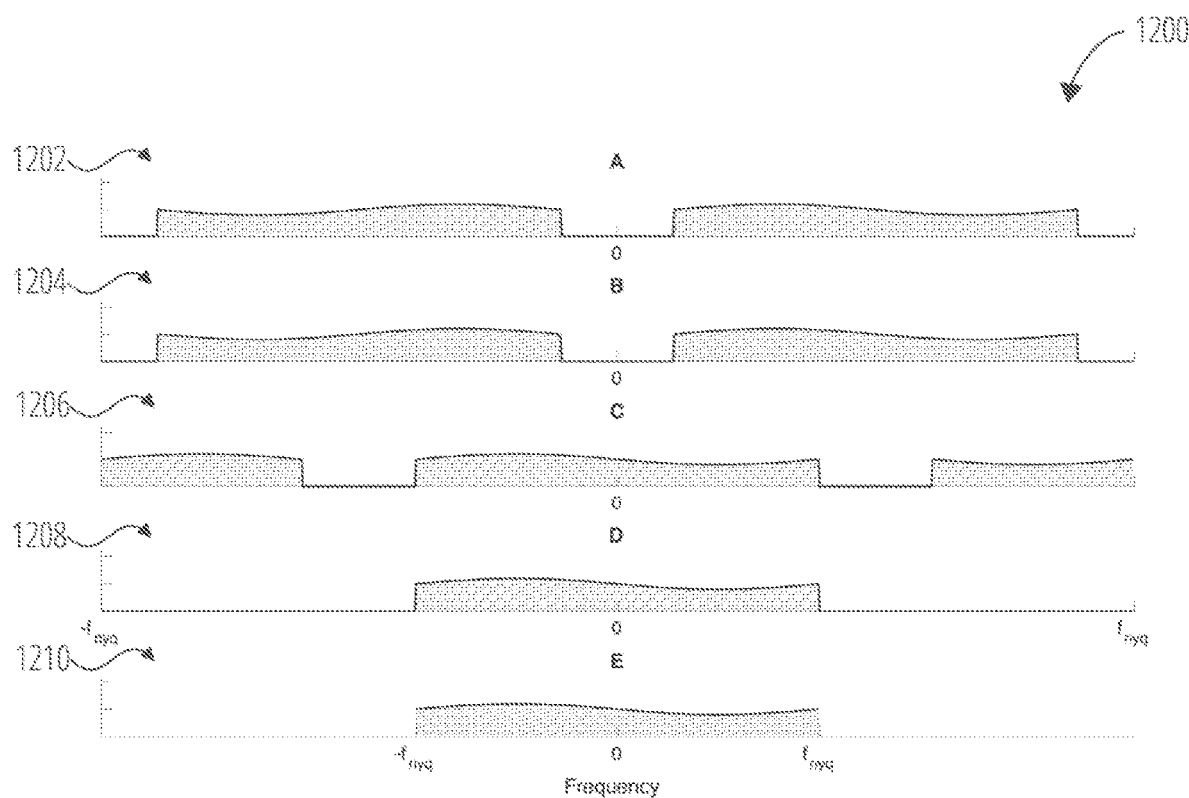
FIG. 12 is a collection of plots illustrating digitization, mixing, filtering, and resampling performed on a received waveform, according to a non-limiting example.

FIG. 12 is a collection of plots 1200 illustrating digitization, mixing, filtering, and resampling performed on a received waveform 1202, according to a non-limiting example. After a modulated optical waveform is reflected from the system under test and interfered with the local oscillator light, a received waveform 1202 such as that illustrated in FIG. 12 is received. The original sequence (or superposition of sequences at different optical time-of-flight delays for elements along the system under test) may be recovered via various means by which the signal is mixed to baseband, filtered, and optionally resampled before the above-described sequence signal processing operations are performed. A non-limiting example embodiment might include digitization of the received waveform 1202, using a sample rate with Nyquist frequency $f_{Nyq}$ higher than the highest signal frequency, resulting in the digitized received waveform 1204. This signal may then be digitally mixed with a complex sinusoid to form mixed signal 1206, low-pass filtered to form the filtered signal 1208, and optionally resampled to form the resampled signal 1210. The digital signal processing operations according to the various embodiments are then carried out on the received signal to recover phasors for each location along the system under test.

When utilizing a Zadoff Chu sequence, the signal may be resampled to place the Nyquist frequency at the extent of the bandwidth of the sequence (FIG. 12E) such that when the conjugate sequence is applied, aliasing ensures that each optical time-of-flight location along the system under test is mapped to a unique frequency.

Figure 13:
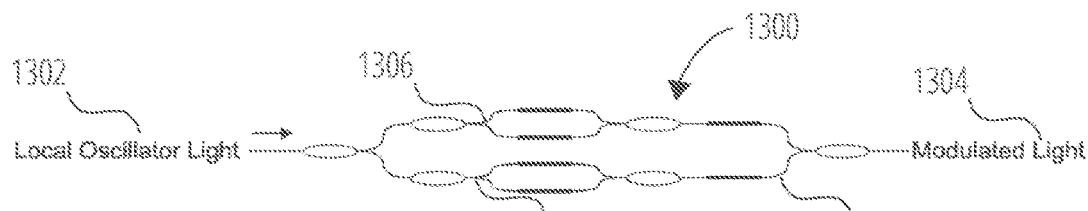
FIG. 13 is a representation of a complex modulator, according to some embodiments.

FIG. 13 is a representation of a complex modulator 1300 (to produce modulated light 1304 at least partially based on local oscillator light 1302), according to some embodiments. The complex modulator 1300 is an example of the modulator 112 of FIG. 1. The complex modulator 1300 may also be utilized together with a real receiver (e.g., the real receiver 1500 of FIG. 15). The complex modulator 1300 splits incoming local oscillator light 1302 and delivers the split light into two inner Mach-Zehnder (MZ) interferometers 1306, 1308 and combines the outputs of the inner MZ interferometers 1306, 1308 into an outer MZ interferometer 1310. The electric fields in the outer (latter) MZ interferometer 1310 are utilized to place the outputs of the inner MZ interferometers 1306, 1308 in quadrature, while the inner MZ interferometers 1306, 1308 are sourced with real and complex components of a sequence that has been up-mixed via a complex sinusoid. Upon mixing with a complex sinusoid, the spectrum of the sequence lies entirely below or above DC, as shown in a received waveform 1602 of FIG. 16. The basic operations after modulation and mixing with a complex sinusoid include sampling the signal, mixing the signal back to baseband, low-pass filtering, and optionally resampling the signal.

Figure 14:
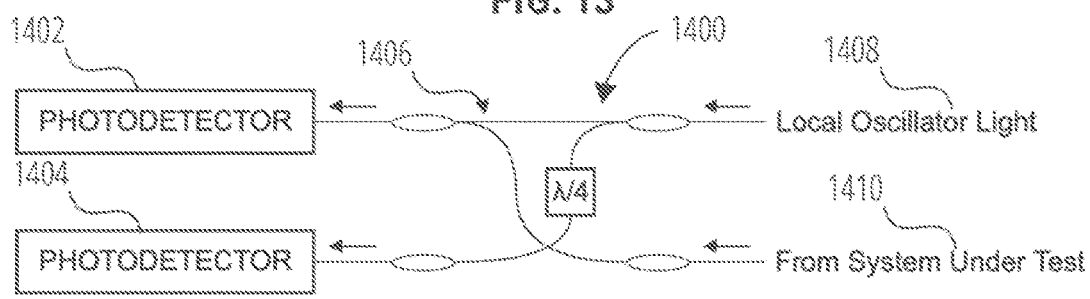
FIG. 14 is a representation of a complex receiver, according to some embodiments.

FIG. 14 is a representation of a complex receiver 1400, according to some embodiments. The complex receiver 1400 is similar to the receiver 140 of FIG. 1. For example, the complex receiver 1400 includes photodetectors 1402, 1404 and an optical hybrid 1406 similar to the photodetectors 106, 108 and the optical hybrid 110 of FIG. 1. The complex receiver is configured to receive local oscillator light 1408 and light 1410 from a system under test.

FIG. 15 is a representation of a real receiver 1500, according to some embodiments. The real receiver 1500 may be used in the measurement system 100 of FIG. 1 in place of the receiver 140 of FIG. 1, which is illustrated as a complex receiver similar to the complex receiver 1400 of FIG. 14. Unlike the complex receiver 1400, however, which utilizes a quarter-wave delay $\lambda/4$ to form an optical 90° hybrid, a real receiver 1500 as shown in FIG. 15 (a non-limiting example) utilizes a single coupler 1502 to interfere local oscillator light 1504 and system-under-test light 1506.

Figure 16:
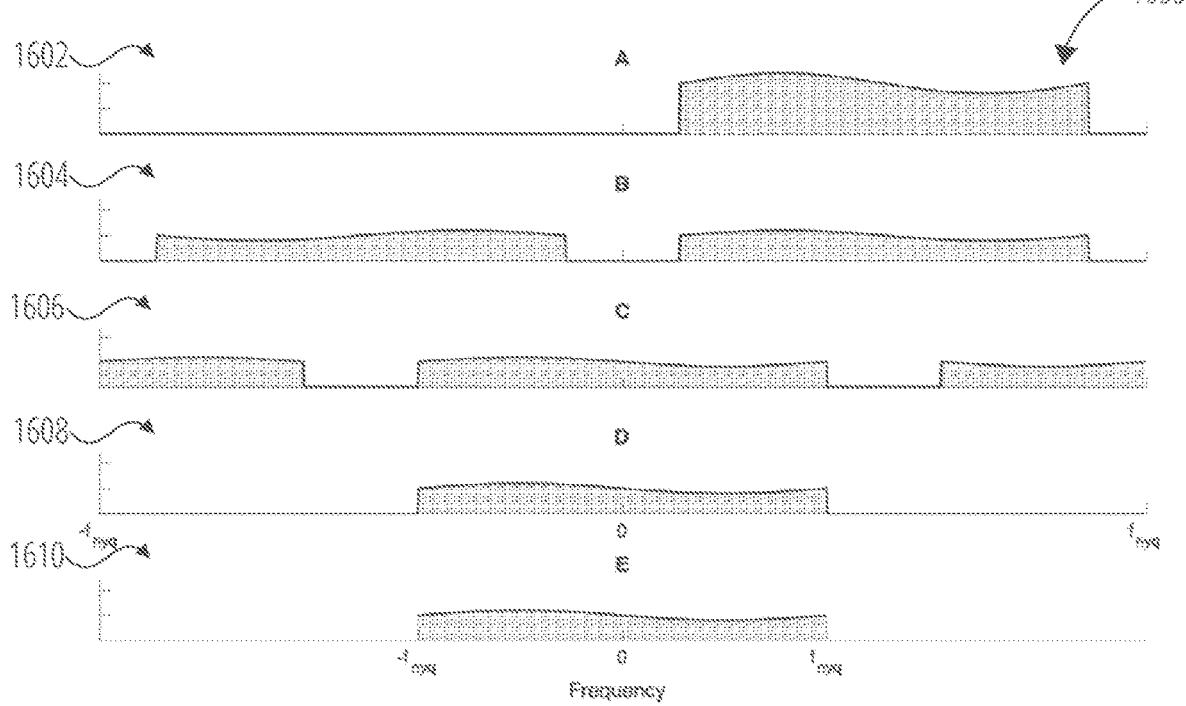
FIG. 16 is a collection of plots illustrating digitization, mixing, filtering, and resampling performed on a received waveform, according to a non-limiting example.

FIG. 16 is a collection of plots 1600 illustrating digitization, mixing, filtering, and resampling performed on a received waveform 1602, according to a non-limiting example. The plots 1600 include the received waveform 1602, a digitized waveform 1604, mixed signal 1606, a filtered signal 1608, and a resampled signal 1610. Digitized waveform 1604 of FIG. 16 depicts the signal after being interfered in the real receiver 1500. The resulting real signal may be digitized using an analog to digital converter and mixed with a complex sinusoid to mix either signal to baseband. The mixed signal 1606 depicts a positive-frequency sequence spectrum mixed to baseband. Low-pass filtering would then yield the filtered signal 1608, after which normal sequence processing may be performed. The signal may optionally be resampled (the resampled signal 1610) to facilitate signal processing according to the various embodiments presented. FIG. 16 depicts a processing flow in which a real receiver 1500 (FIG. 15) is utilized, but a complex receiver 1400 (FIG. 14) could instead be utilized.

Indeed, various different embodiments are contemplated herein. For example, a real or complex modulator may be used with a real or complex receiver. The sequence may be transmitted as a baseband, up-, down- or up/down-mixed signal. The signal or signals may be bandpass filtered instead of mixed to baseband followed by low-pass filtering. The signal or signals could be processed in either the analog domain or digitized (sampled) and processed in the digital domain.

Figure 17:
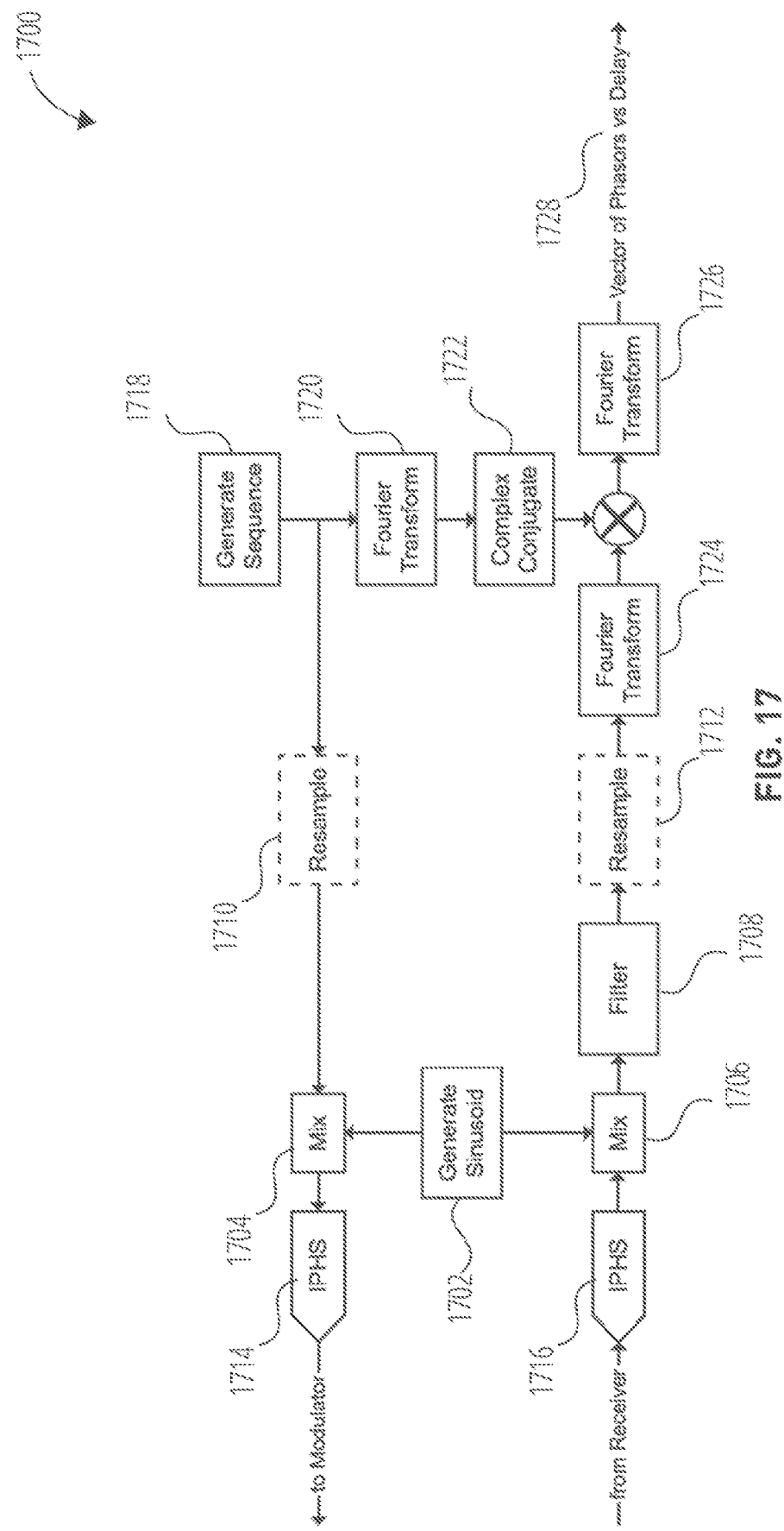
FIG. 17 is a functional flow diagram for a signal processing scheme appropriate for use with a real modulator (e.g., the real modulator of FIG. 11) and a real receiver (e.g., the real receiver of FIG. 15)

FIG. 17 is a functional flow diagram for a signal processing scheme 1700 appropriate for use with a real modulator (e.g., the real modulator 1100 of FIG. 11) and a real receiver (e.g., the real receiver 1500 of FIG. 15). A sequence may be generated 1718, a Fourier transform 1720 of the sequence may be taken, and a complex conjugate 1722 of the Fourier transformed sequence may be determined. As shown in the FIG. 17, a sinusoid at an appropriate frequency is generated 1702 in digital logic and used to mix 1704 the outgoing generated sequence to a real modulator and mix 1706 incoming received data from a real modulator. Filtering 1708 follows the mixing 1706 operation on the received signal. Optional resampling 1710 is performed on the sequence prior to mixing 1704 in the modulation path, and optional resampling 1712 is performed after filtering 1708 in the receive path. A Fourier transform 1724 may be taken of the filtered, and optionally resampled, received data. A Fourier transform 1726 is taken of the product of the result of the complex conjugate 1722 and a result of the Fourier transform 1724. The resulting signal is a vector of phasors versus delay 1728.

At operations 1714, 1716, respectively, the signal processing scheme 1700 includes converting the sequence from a digital representation to an analog representation, for example via digital-analog converter(s). The sequence may be communicated as an in-phase component of a modulation signal (e.g., the modulation signal 138 of FIG. 1).

A polarization-resolved sensing scheme may be organized to resolve the orthogonal polarization components at each location along the system under test relative to a single polarization reference in the system. Polarization-resolved sensing refers to the ability to differentiate independent magnitude and phase measurements for each of two orthogonal states of polarization (SoP) relative to a set of orthogonal reference polarization states for each location along the system under test. Though arbitrary orthogonal states may be supported, a straightforward orthogonal SoP selection is perpendicular and in-plane linearly polarized light, commonly referred to as S- and P-states.

Polarization-resolved OCoDR sensing utilizes a system architecture in which the system under test is illuminated with linearly polarized light from a laser, and in which the responses to the incident light at two states of polarization are independently resolved. The orthogonal SoPs are defined by a component in the dual-polarization receiver, e.g., a polarization beamsplitter.

Figures 18, 19:
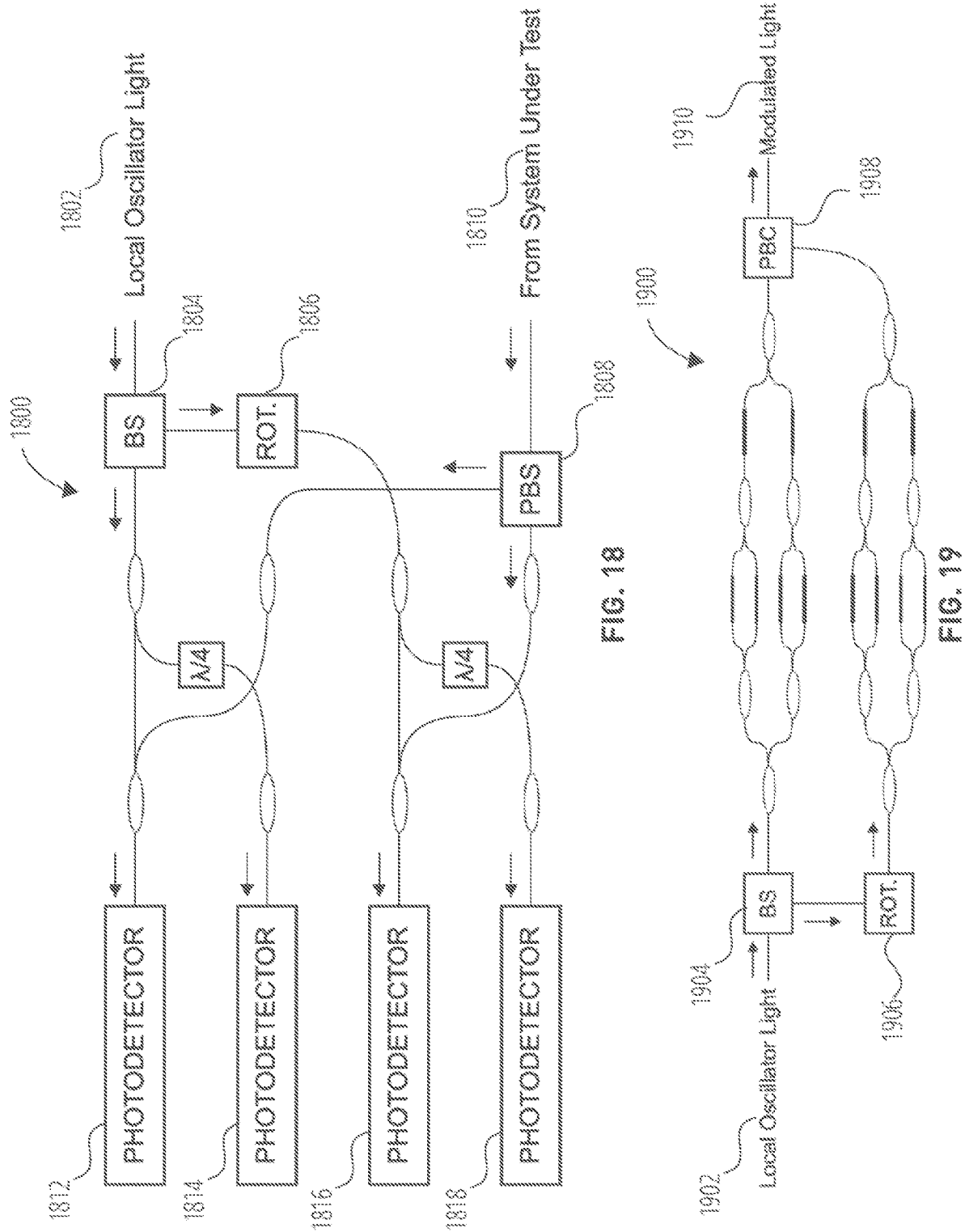
FIG. 18 is a representation of a dual-polarization complex receiver, according to some embodiments.
FIG. 19 is a represents of a dual-polarization complex modulator, according to some embodiments.

FIG. 18 is a representation of a dual-polarization complex receiver 1800, according to some embodiments. The dual-polarization complex receiver 1800 splits linearly polarized local oscillator light 1802 via a beamsplitter 1804 (BS 1804) into two paths and rotates 1806 (ROT 1806) one path, resulting in a set of fields with orthogonal SoPs. The dual-polarization complex receiver 1800 also includes a polarization beamsplitter 1808 (PBS 1808) that splits system-under-test light 1810 into two orthogonal linear SoPs. In this example, the PBS 1808 forms the receiver polarization reference for the system. Each PBS output is interfered with co-polarized local oscillator light (from the local oscillator light 1802) and converted to an electronic signal via a detector (or detectors) (e.g., photodetectors 1812, 1814, 1816, and 1818) specific to each SoP to recover independent signals—one per orthogonal SoP. The complex, dual-polarization receiver depicted in FIG. 18 generates two complex interferograms—one per orthogonal SoP.

Other selections for orthogonal SoPs are contemplated herein, including left- and right-hand circularly polarized light, or any other arbitrary set of orthogonal SoPs.

To accommodate the dual-polarization complex receiver 1800, the digital subsystem may include additional analog-digital converters, acquisition circuitry and/or logic, and signal processing logic for converting the additional channels to digital form and applying the same signal processing to each SoP.

After signal processing is performed according to the various embodiments disclosed herein, the result is two complex vectors representing the two orthogonal SoPs. The magnitudes of the traces represent the reflectivity of the given feature at the given position in the system under test at orthogonal SoPs. The phases of the traces represent the optical time-of-flight (or change thereof) for respective SoPs.

Polarization-diverse sensing refers to a system architecture in which the system under test is illuminated with two orthogonal modulator SoPs, and the responses at two orthogonal receiver SoPs are independently resolved for each of the two orthogonal modulator SoPs. Example embodiments of signal separation for the orthogonal launch SoPs include time-division multiplexed (TDM) and simultaneous orthogonal polarization illumination. TDM orthogonal SoP illumination and reception involves utilizing an optical switch or shutter to sequence the orthogonal SoPs in time.

FIG. 19 is a representation of a dual-polarization complex modulator 1900, according to some embodiments. The dual-polarization complex modulator 1900 is an example of the modulator 112 of FIG. 1. Simultaneous orthogonal SoP illumination and reception offers the benefit of continuous polarization-diverse measurement. A linearly polarized input local oscillator light 1902 is split via a beamsplitter 1904 (BS 1904), one branch is rotated 1906 (ROT 1906) to create an orthogonal SoP in the second path, a complex modulator for each SoP imparts a complex sequence onto each SoP before the outputs of each are combined into a single output via a polarization beam combiner 1908 (PBC 1908) to provide modulated light 1910.

Figure 20:
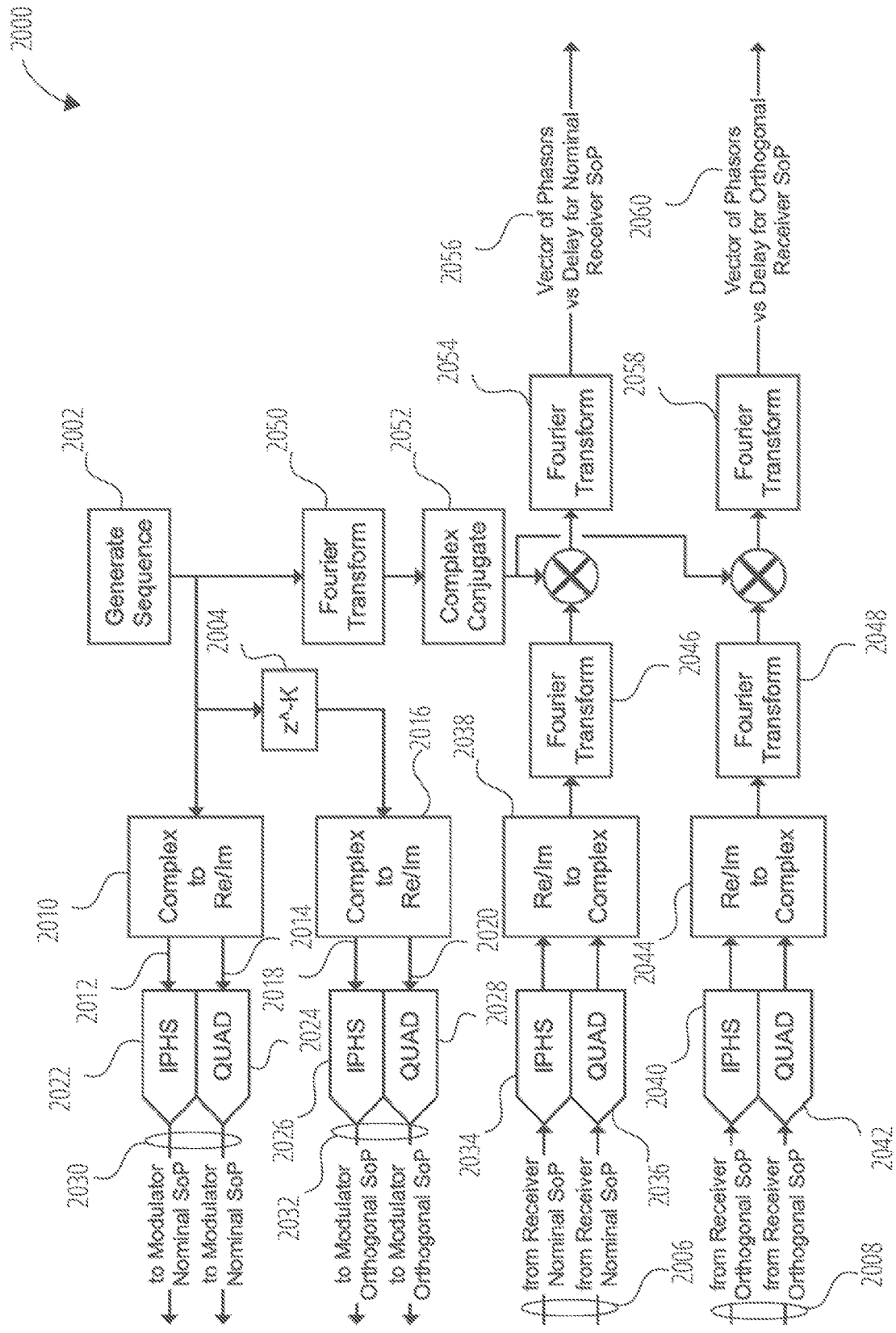
FIG. 20 is a functional flow diagram for a signal processing scheme 2000 appropriate to use with polarization-diverse OCoDR embodiments.

FIG. 20 is a functional flow diagram for a signal processing scheme 2000 appropriate to use with polarization-diverse OCoDR embodiments. In the signal processing scheme 2000 includes generating 2002 a sequence. A Fourier transform 2050 may be performed on the generated sequence, and a complex conjugate operation 2052 may be performed on the transformed sequence. The generated sequence is also sent to S- and P-polarization (or any two orthogonal SoP) inputs of a dual-polarization complex modulator (e.g., the dual-polarization complex modulator 1900 of FIG. 19). A differential delay 2004 of K samples is imparted on the sequence that is sent to one SoP relative to that sent to the orthogonal SoP. The generated sequence may be converted 2010 from a continuous stream of complex numbers to real parts 2012 and imaginary parts 2014. A delayed version of the generated sequence may be converted 2016 to real parts 2018 and imaginary parts 2020.

At operations 2022 and 2024, respectively, the signal processing scheme 2000 includes converting the real and imaginary parts, respectively of the sequence from a digital representation to an analog representation, for example via digital to analog converter(s). The real parts 2012 may be communicated as an in-phase component of a nominal modulation signal 2030 and the imaginary parts 2014 may be communicated as a quadrature component of the nominal modulation signal 2030. Similarly, at operations 2026 and 2028, respectively, the signal processing scheme 2000 includes converting the real and imaginary parts, respectively, of the delayed sequence from a digital representation to an analog representation. The real parts 2018 may be communicated as an in-phase component of an orthogonal modulation signal 2032 and the imaginary parts 2020 may be communicated as a quadrature component of the orthogonal modulation signal 2032. The nominal-SoP modulation signal 2030 and the orthogonal-SoP modulation signal 2032 may be provided to a modulator (e.g., to the dual-polarization complex modulator 1900 of FIG. 19).

The signal processing scheme 2000 also includes, at operations 2034 and 2036, converting in phase and quadrature components, respectively, of nominal measurement signals 2006, from analog to digital. The signal processing scheme 2000 also includes converting 2038 the in-phase and quadrature components of a continuous interferogram to a continuous stream of complex numbers, which are transformed using a Fourier transform 2046. The transformed stream of complex numbers may be multiplied with the complex conjugated transformed sequence from the complex conjugate operation 2052, and a Fourier transform 2054 may be taken to provide a vector of phasors vs. delay 2056 for a nominal receiver SoP.

Similarly, the signal processing scheme 2000 includes, at operations 2040 and 2042, converting in phase and quadrature components, respectively, from orthogonal measurement signals 2008, from analog to digital. The signal processing scheme 2000 further includes converting 2044 the in-phase and quadrature components of a continuous interferogram to a continuous stream of complex numbers, which are transformed using a Fourier transform 2048. The transformed stream of complex numbers may be multiplied with the complex conjugated transformed sequence from the complex conjugate operation 2052, and a Fourier transform 2058 may be taken to provide a vector of phasors vs. delay 2060 for an orthogonal receiver SoP.

Other operations are carried out according to the various embodiments presented herein. In some embodiments, it may be beneficial to double the sequence length relative to the optical path length of desired system under test such that K is set to substantially half the doubled sequence length. When signal processing is performed according to the various embodiments and the vector of phasors is recovered, one region of the vector space will contain phasors arising from the one launch SoP (defined by the dual-polarization modulator) whereas another region of the vector space will contain phasors arising from the orthogonal launch SoP. The sequence length and/or parameter K can be tuned to ensure that desired features in the orthogonal SoP occupy unique locations within the vector of phasors.

By using a dual-polarization receiver together with the dual-polarization modulator, four independent signals are received—two orthogonal launch SoPs discriminated by two orthogonal receive SoPs. The four signals may be used to infer a physical path length or path length difference responsive to environmental perturbations on the system-under-test (e.g., temperature, strain, vibration) with suppressed sensitivity to polarization transfer function perturbations. Alternatively, the signals may be used to suppress the effect of environmental perturbations and measure the polarization evolution of the system under test over space and time.

This approach offers the benefit of illuminating the system under test simultaneously with orthogonal incident polarization states together with simultaneous detection and separation of the condition(s) of the system under test responsive to each orthogonal polarization state. Independent analysis of the response of the system under test may then be conducted on one or both orthogonal states to infer additional conditions of the system under test such as slow/fast axis orientation, birefringence, transverse force, and others as a function of time and position along the system under test.

Figure 21:
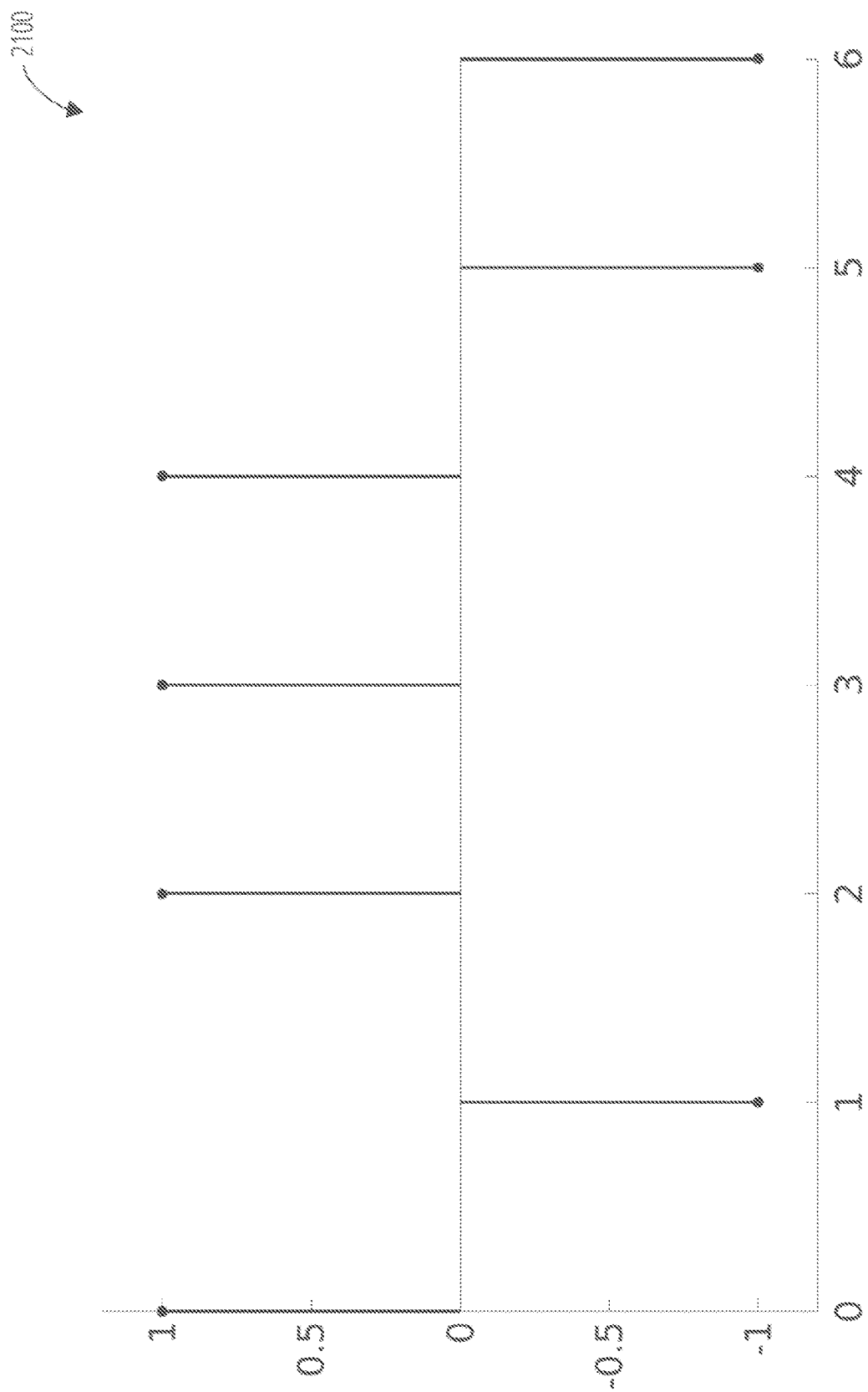
FIG. 21 is a plot illustrating an example of a PRBS sequence, according to some embodiments.

FIG. 21 is a plot illustrating an example of a PRBS sequence 2100, according to some embodiments. The PRBS sequence 2100 has a length of 7 and has values in the set $\{+1, -1\}$. Referring to FIG. 1 and FIG. 21 together, the modulation signal source 114 may be configured to output a modulation signal 138 that exhibits an autocorrelation that is unity at delay time zero and that approaches zero at other delays. A PRBS is a special binary sequence (i.e., having two values, in this case +1 and -1) that appears to be random but in fact may easily be calculated and replicated.

A PRBS exhibits a circular autocorrelation that is unity at delay time zero and that approaches zero at other delays. Specifically, a maximal-length PRBS of length $N=2^m-1$ exhibits an autocorrelation that is unity at delay zero and $-1/N$ at all (non-periodic) delay times outside of zero chip time, where one chip time is the atomic time unit (i.e., sample time) of the PRBS, and where the PRBS includes N chips. An example of a PRBS sequence 2100 of length N=7 is shown in FIG. 21. The circular autocorrelation of this PRBS sequence 2100 is shown in FIG. 22.

Figure 22:
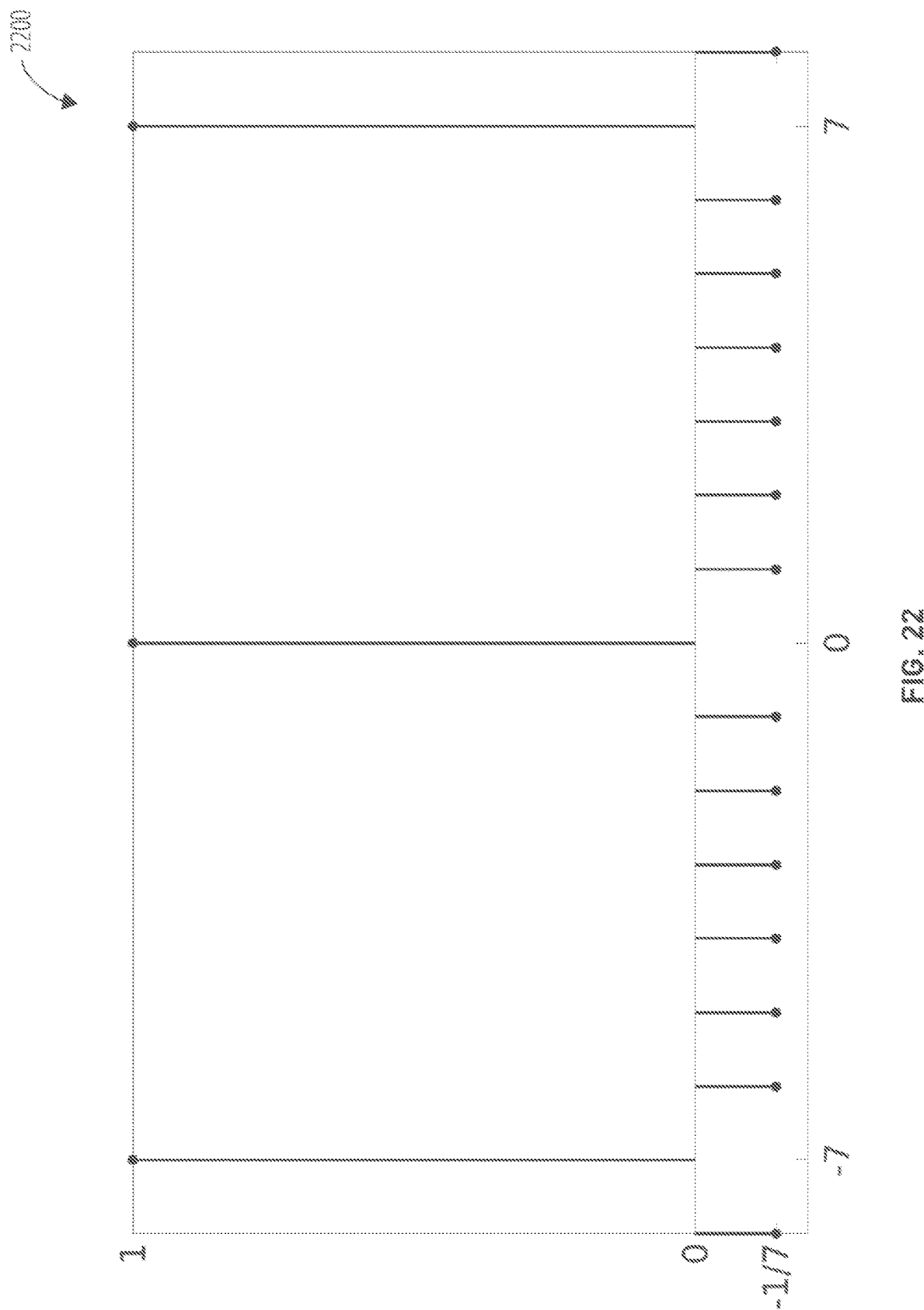
FIG. 22 is a plot illustrating a circular autocorrelation of the PRBS sequence of FIG. 21.

FIG. 22 is a plot illustrating a circular autocorrelation 2200 of the PRBS sequence 2100 of FIG. 21. FIG. 22 shows an autocorrelation value of unity at delay time 0 (as well as multiples of the sequence length) and a value of $-\frac{1}{7}$ for all other delay times. In some embodiments the complex signal from the receiver could be complex-conjugated instead of the sequence.

Figure 23:
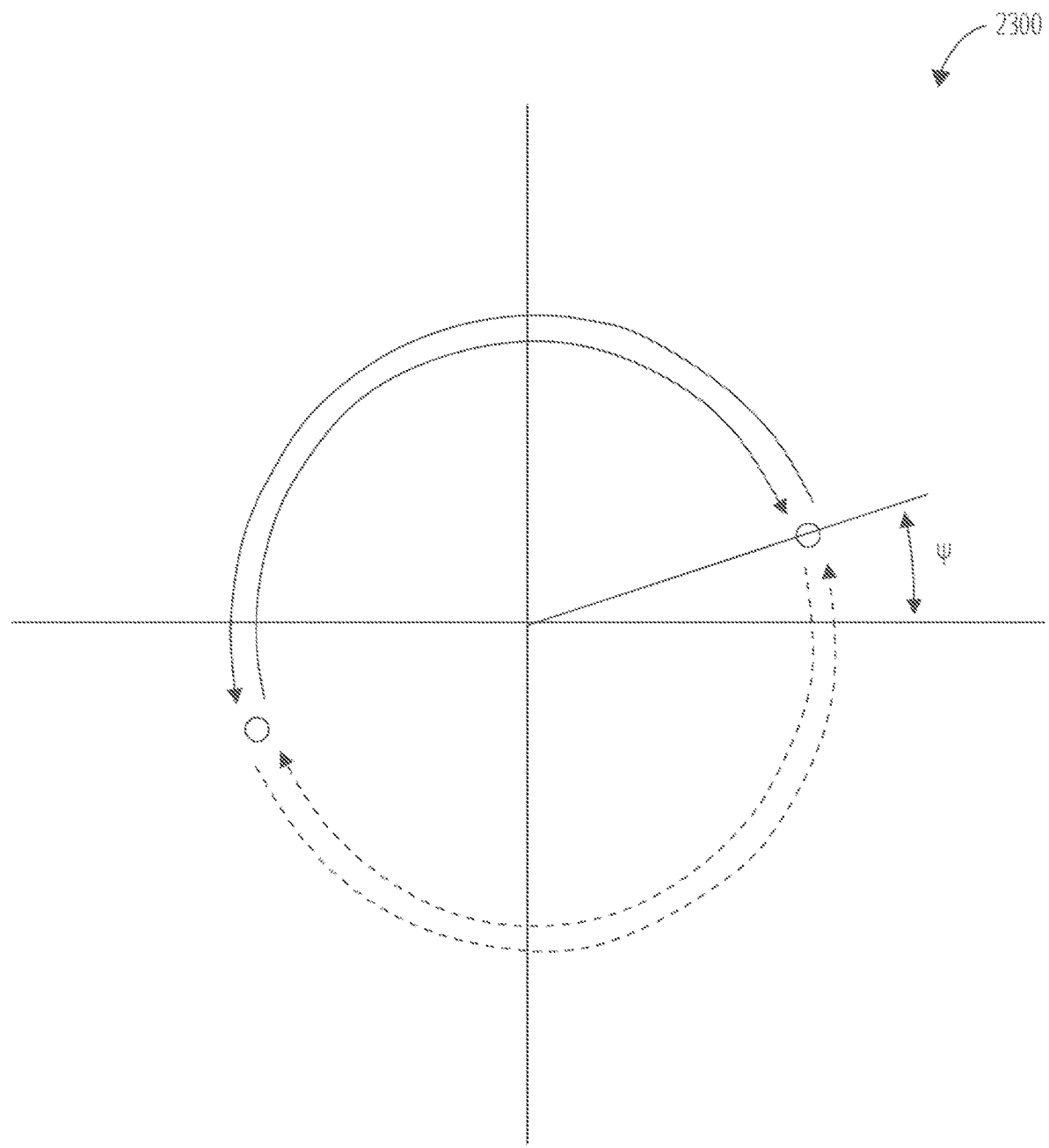
FIG. 23 is a plot of interferogram signals, according to some embodiments.

FIG. 23 is a plot of interferogram signals 2300, according to some embodiments. Other modulation means may be used to achieve reflective element discrimination according to the present disclosure. For example, instead of a phase modulator, a Mach-Zehnder modulator could be used in a push-pull configuration to modulate the phase of one branch by $\pi$ radians relative to another to accomplish the desired phase relationship. In this case, the phasor traverses the unit circle directly through the origin instead of along the perimeter of the unit circle. A Mach-Zehnder modulator configured for binary phase-shift keying (BPSK) would accomplish the desired modulation.

A phase modulator may be used to impart the PRBS signal (e.g., the modulation signal 138 of FIG. 1 in some embodiments) on the incident EM radiation 124. A phase modulator may be used to modulate the incident EM radiation 124, which is then interfered with the reference EM radiation 130 for a single sensor. In this case, as the input signal to the phase modulator is moved from one symbol at nominal 0° to another at 180°, a set of quadrature waveforms are obtained from the receiver that traverse the perimeter of the unit circle. This is shown in FIG. 23, where symbols are represented by the two dots, and traversal between symbols is shown by the arrows with solid lines. The diagram shows that when using a phase modulator there is a continuum of phases as the output traverses from one symbol to another, but the amplitude is constant.

FIG. 23 illustrates traversal of interferogram signals (x- and y-signals forming quadrature) between symbol at 0° and symbol at 180° (solid-line arrows) and between 0° and −180° (dotted-line arrows). Both symbols are offset by optical phase angle $\psi$. One way of calculating a PRBS is via use of a linear-feedback shift register (LFSR). A maximum-length PRBS may be created using an LFSR having a register length m. As m increases, the non-unity autocorrelation function values of $-1/N$ approach zero asymptotically as $\frac{1}{2}^m$.

The modulator 112 of FIG. 1 may be sourced by a radio-frequency (RF) electrical signal, the values of which at integer chip times form a PRBS. When this signal is superimposed on an incident EM radiation 124 before provision to the sensor network (e.g., the system under test 116 of FIG. 1), individual reflective elements of the sensor network will reflect this signal at unique delays. For example, a reflective element 10 meters along the sensor network will reflect the PRBS signal at a nominal delay of substantially 100 ns (given substantially a 10 ns/m double-pass optical time-of-flight delay in optical fiber) whereas a reflective element 20 meters along the sensor network will reflect the PRBS signal with substantially a 200-ns delay. If the chip time of the PRBS is, for example, 10 ns (e.g., a PRBS chip rate of 100 MCps), the PRBS signal reflecting at 20 m will be 10 chips behind the PRBS waveform reflecting from the 10-meter element.

Because the receiver outputs are AC-coupled, in order to properly recover the amplitude, iteration between a symbol at +180° to another at −180° may be performed. The symbols at +180° and −180° are the same, but the traversal is different. The traversal to the −180° symbol is shown as the dotted-line arrows in FIG. 12. Given the limitations of waveform generators, it may be difficult to iterate between +180° and −180° symbols on a symbol-to-symbol basis. Accordingly, iteration may be done on a sequence-to-sequence basis, which is sufficient to enable recovery of the amplitude despite AC-coupling of the signals.

A drawback of using a phase modulator is that, for most phase offsets, the x- and y-components of the signal have sharp turnaround points as the symbols are traversed.

Figure 24:
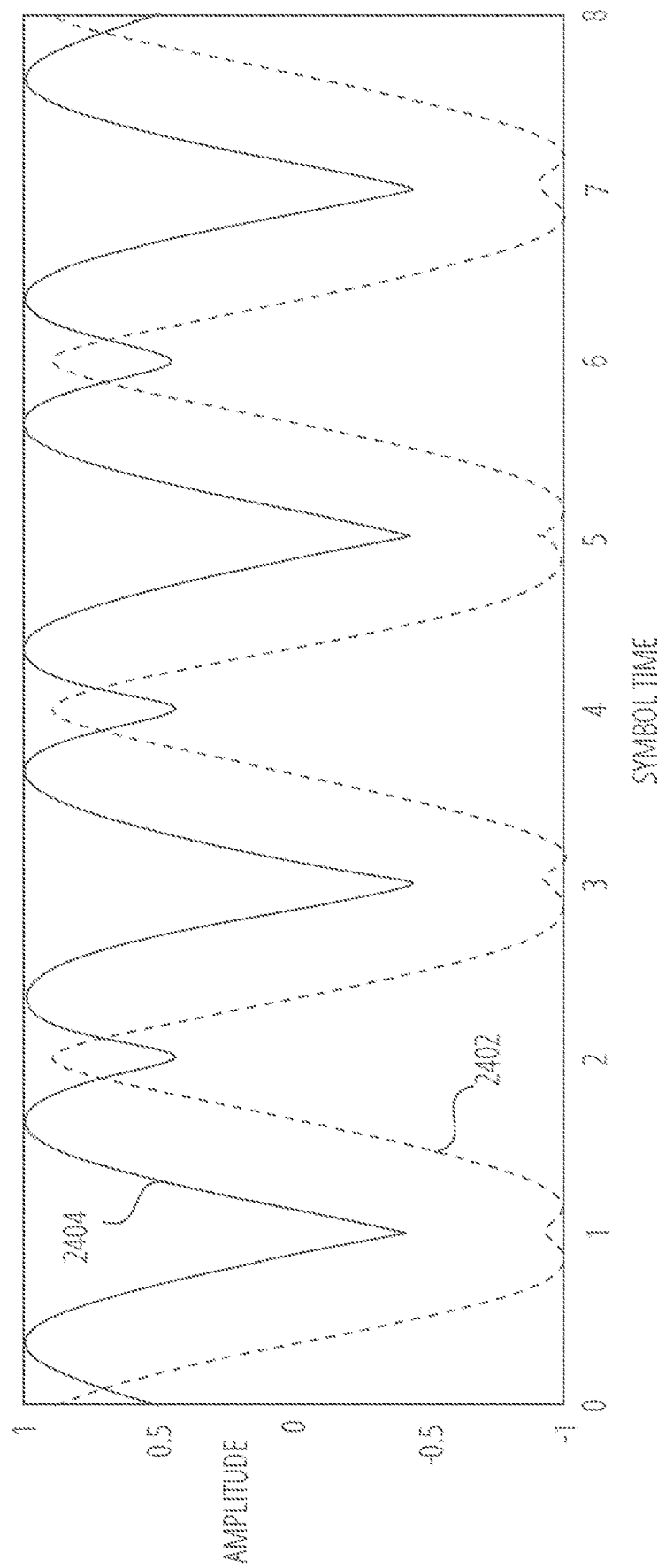
FIG. 24 is a plot illustrating amplitudes of an x-component and a y-component an interferogram signal, according to some embodiments.

FIG. 24 is a plot illustrating amplitudes of an x-component 2402 and a y-component 2404 an interferogram signal, according to some embodiments. FIG. 24 shows the x-component 2402 and the y-component 2404 of traversals from 0° to 180° and back using phase modulator approach for ψ=25°. FIG. 24 shows the x-component 2402 and the y-component 2404 of the signal as the symbols 0°, 180°, 0°, 180° are traversed given the angle offset shown in FIG. 23. A wider bandwidth is needed to represent the real and imaginary signals due to the sharp turnarounds. This is a drawback because the received signal bandwidth should be two to three times larger than the chip rate in order to properly recover the signals. A drawback of using a phase modulator is that, for most phase offsets, the x- and y-components of the signal have sharp turnaround points as the symbols are traversed.

In some embodiments complex amplitude modulation may be used with a Mach-Zehnder (MZ) modulator—i.e., a splitter followed by two phase-modulated paths, followed by a combiner. In a basic arrangement, there are two phase modulation inputs to the modulator. If the same signal is fed to both, then the MZ modulator becomes a phase modulator. If opposite signals are fed to each, then the MZ modulator becomes an amplitude modulator. By biasing the MZ modulator at $V_\pi$ and modulating the inputs such that they traverse from 0 to $2V_\pi$, the amplitude may be modulated to a +1 state and a −1 state (e.g., +1 state at 180°), as shown in FIG. 25.

Figure 25:
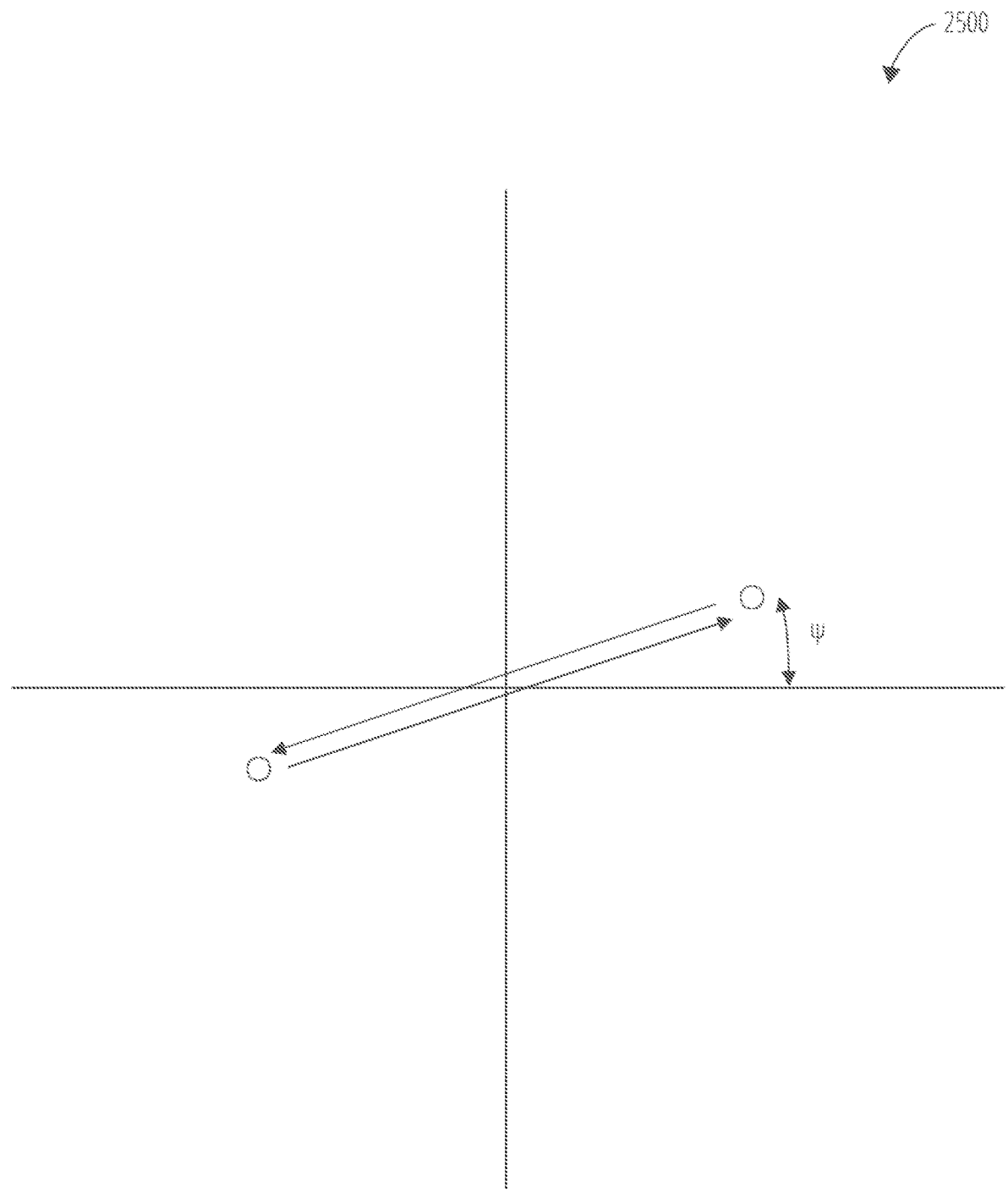
FIG. 25 is a plot illustrating traversal of interferogram signals between a symbol at 0° and a symbol at 180°, according to some embodiments.

FIG. 25 is a plot illustrating traversal of interferogram signals 2500 (x- and y-signals forming quadrature) between a symbol at 0° and symbol at 180° (solid-line arrows), according to some embodiments. A consequence of using a MZ modulator for amplitude modulation is that, as the signal is traversed from one symbol to another, the phase of the signals is either 0° or 180°, but with a continuum of amplitudes. This is better suited to OCoDR since, if the traversal amplitude trajectories are symmetric, there will be good cancellation of un-tuned sensors because the trajectory signals between symbols always have either 0° or 180° phase.

Figure 26:
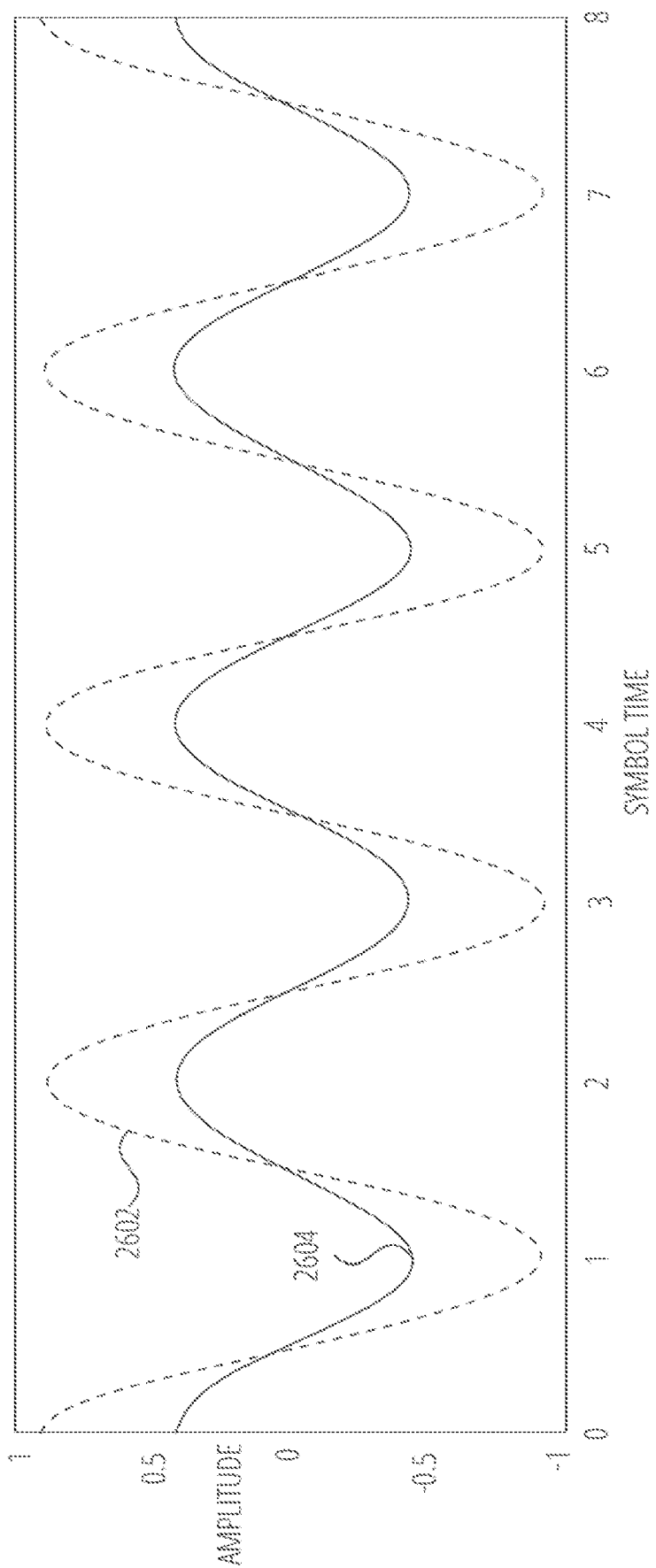
FIG. 26 is a plot illustrating an x-component and a y-component of traversals from 0° to 180° and back using an MZ modulator approach for $\psi=25°$, according to some embodiments.

Another benefit to this method is that, as the modulator input signals are varied linearly from one symbol to the other, the amplitude varies sinusoidally and the x- and y-components of the signals have no additional high-frequency content. FIG. 26 shows the x- and y-components of the signal as the symbols 0°, 180°, 0°, 180° are traversed given the angle offset shown in FIG. 25.

FIG. 26 is a plot illustrating an x-component 2602 and a y-component 2604 of traversals from 0° to 180° and back using an MZ modulator approach for ψ=25°, according to some embodiments. The x-component 2602 and the y-component 2604 are sinusoidal and no higher-frequency component is needed to represent them. The x-component 2602 and the y-component 2604 are in-phase whereas the x-component 2402 and the y-component 2404 are in quadrature in FIG. 24.

The x-component 2602 and the y-component 2604 of the interferogram have similar functional form to the MZ modulator drive signals and do not occupy a wider bandwidth. Instead of requiring two to three times the bandwidth relative to the modulator drive bandwidth to represent the receiver signals in the phase modulator case, a MZ modulator may be used and only requires a bandwidth similar to the drive bandwidth. By way of non-limiting example, a root raised-cosine (RRC) filter with a beta parameter of 1 may be used, which results in the occupied bandwidth being twice the chip rate. The required sample rate is also twice the chip rate. It may be possible to reduce the beta parameter to correspondingly reduce the excess bandwidth such that the required bandwidth is closer to substantially 1.2 times the chip rate.

Another advantage of using a MZ modulator is that devices may be manufactured with push-pull drive, which means modulation over $\pm V_\pi$ derives from two differential inputs so each must only swing over a range $\pm V_\pi/2$. By way of non-limiting example, a modulator may exhibit $V_\pi=3.5$, so each output must only swing ±1.75 volts.

Telecommunications components are available designed for BPSK, QPSK, 16 QAM and higher-order modulation. Many components are designed with two MZ modulators with a 90 degree offset between them to form a quadrature modulator. A quadrature modulator may be used according to various embodiments described above to generate a complex-valued sequence of modulation signal 138 according to e.g., a CAZAC (including a Zadoff Chu), ZACZ, or other complex-valued sequence. Many are also designed with one modulator set in an S-polarization and another in a P-polarization.

Figure 27:
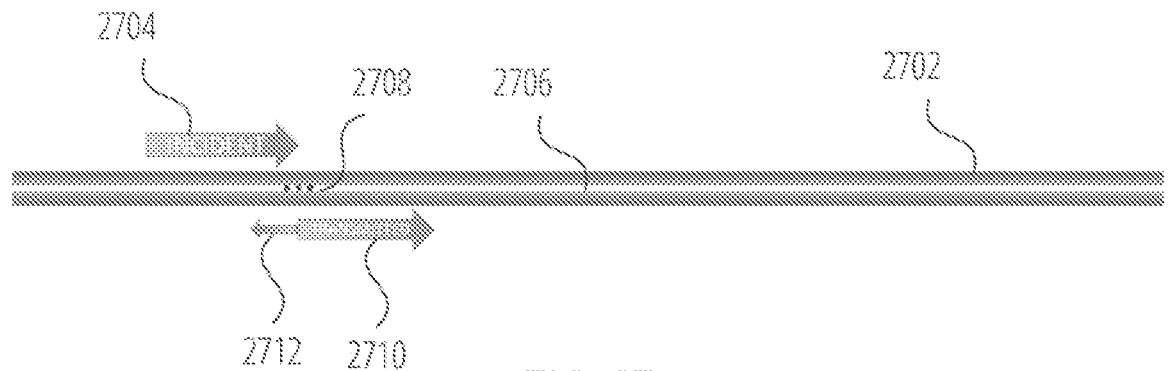
FIG. 27 is a side view of an example of an optical fiber.

FIG. 27 is a side view of an example of an optical fiber 2702. OCoDR measures change in optical time-of-flight to reflectors (scattering centers, etc.) along a system under test. Sensing may be accomplished via fiber Bragg gratings, partial reflectors, Rayleigh backscatter, or other back reflecting or back scattering mechanisms. FIG. 27 depicts incident radiation 2704 in the optical fiber 2702 incident on a FBG or scattering center 2708 (depicted by three dots in the fiber core 2706). A portion of light is transmitted as transmitted light 2710 while a (typically, smaller) portion of light is reflected as reflected light 2712. Some embodiments disclosed herein enable the optical time-of-flight difference between a local oscillator path and a system-under-test path to be measured. By substantially isolating (or tracking) the local oscillator path such that the optical time-of-flight in the local oscillator (or reference) path is substantially constant (or known), changes in optical time-of-flight in the system under test path to any given reflector may be measured. For example, if the reflective element (e.g., scattering center 2708) in FIG. 27 is affixed to a substrate that is vibrating, those vibrations may cause changes in optical time-of-flight in the path to and from the reflector. Equivalent mechanical path length changes may be inferred to on the order of 1 nm or better using some embodiments disclosed herein. Consequently, vibration with corresponding mechanical excursion ~1 nm (or greater) may be resolved using embodiments disclosed herein. Similarly, cumulative strain and/or temperature in the system-under-test path may cause changes to refractive index and/or physical path length of the system-under-test medium. By monitoring and integrating (i.e., unwrapping) the phase of the interferometric phasor corresponding to a given reflective element, changes in temperature and/or strain of the system-under-test path up to the given reflective element may be monitored.

Figure 28:
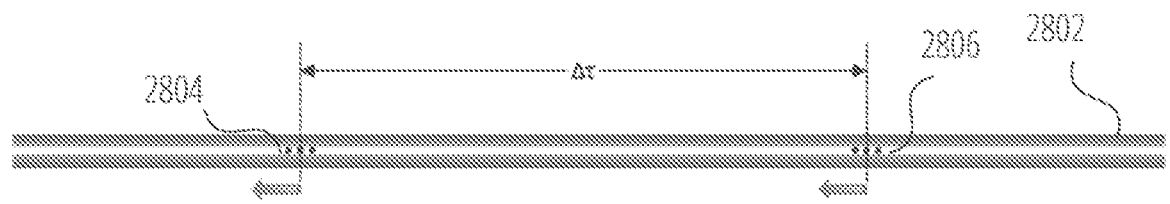
FIG. 28 is another example of an optical fiber.

FIG. 28 is another example of an optical fiber 2802. In the example depicted in FIG. 28 two FBGs 2804 and 2806 may be utilized as partial reflectors. Short FBGs have the advantage that the response spectrum is wide and therefore they support a wide temperature and/or strain (or other effects that may be transduced to optical path length change) dynamic range. If two reflectors (e.g., scattering centers, etc.) are utilized, a measurement may be conducted of the temperature and/or strain between the reflectors. This may be accomplished by monitoring and unwrapping (i.e., integrating) the phase of the phasors corresponding to the two reflective elements, then subtracting the phase from one reflector from the phase of the other reflector. Such an operation isolates the temperature and/or strain effects due solely to the path between the two reflectors. Alternative equivalent mathematical operations may be performed, such as for example multiplication of a phasor corresponding to a first reflective element (e.g., the FBG 2804) with the complex conjugate of another phasor corresponding to a second reflective element (e.g., the FBG 2806), then unwrapping the phase of the product.

In the Zadoff-Chu sequence architecture 400 of FIG. 4 (and others including the frequency domain architecture 300 of FIG. 3), the Fourier transform output may encode a single reflector among multiple samples of the Fourier transform if the reflector is located at an optical time-of-flight delay that is not an even multiple of the inverse of the sample rate. In this case, multiple samples may be utilized to infer a single phasor with enhanced SNR relative to a single phasor (i.e., single complex transform-domain sample) by performing a phase offset calibration at a nominal condition then bringing the multiple phasors (complex samples) into the same angle before adding the phasors.

Optical path length in an optical fiber is dually sensitive to both strain and temperature. A temperature measurement may be made by isolating an optical fiber from strain, monitoring the difference in unwrapped phase from two reflective (scattering) elements along the system under test, and converting the phase to a temperature via a calibration constant. A strain measurement may be made by co-locating a strain-isolated fiber that is tightly thermally coupled to a strain-coupled fiber, then subtracting the temperature-only measurement of the strain-isolated fiber from the strain plus temperature measurement of the strain-coupled fiber.

Figure 29:
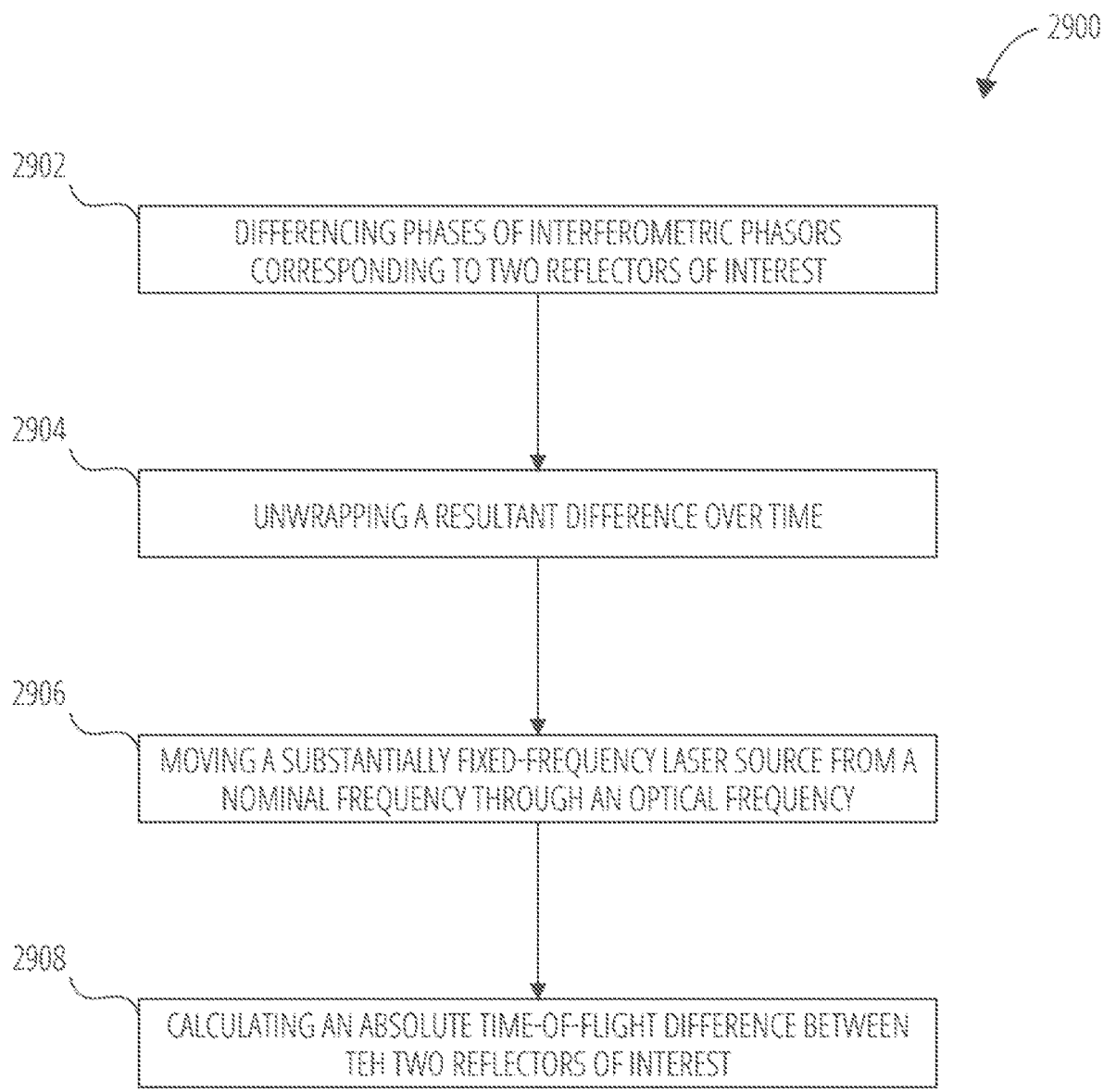
FIG. 29 is a flowchart illustrating a method of performing absolute measurement of a system under test, according to some embodiments.

FIG. 29 is a flowchart illustrating a method 2900 of performing absolute measurement of a system under test, according to some embodiments. As discussed above, OCoDR is capable of measuring changes in temperature or strain from a nominal state, the nominal state being the state at the beginning time at which the phase of the interferometric phasor is integrated (i.e., unwrapped). Embodiments disclosed herein may be extended to absolute measurement by performing the method 2900 outlined in FIG. 29. At operation 2902, the phase of interferometric phasors corresponding to two reflectors of interest is differenced (i.e., the difference is taken of one phasor relative to another). At operation 2904, a resultant difference is unwrapped (tracked) over time. At operation 2906 a substantially fixed-frequency laser source is slowly moved from a nominal frequency $v_o$ through an optical frequency $v_0+\Delta v$, not necessarily in a linear manner, so long as the optical frequency is moved through a change $\Delta v$. In some embodiments moving the substantially fixed-frequency laser source from the nominal frequency through an optical frequency includes tuning the substantially fixed-frequency laser slowly (or linearly) so as to induce a zero (or known) doppler shift in the Fourier-transform location of the interferometric phasor for a given feature (given that the interferometric phasor is given by $e^{i\psi_d}=e^{i2\pi v \tau_d}$ and a change in $v$ would result in an offset in the Fourier-transform domain of the reflector of interest). A faster tuning of the laser is also possible given that the doppler shift is accounted for by adjusting the Fourier transform sample(s) considered for a given reflector.

If interferometric phasors of two optical time-of-flight delays (i.e., locations along the system under test) are differenced, the resulting phase will be proportional to $v\Delta\tau_d$, where $\Delta\tau_d=\tau_{d_2}-\tau_{d_1}$, and $\tau_{d_1}$, $\tau_{d_2}$, correspond to the two locations of interest. If the system under test is isolated from environmental perturbations for the time over which the laser is tuned over $\Delta v$, then the phase difference may be tracked (i.e., unwrapped or integrated) to yield a total phase excursion $\Delta\psi_d$ given by $\Delta\psi_d=2\pi(v_o+\Delta v)\Delta\tau_d-2\pi v_o\Delta\tau_d=2\pi\Delta v\Delta\tau_d$. Given precise knowledge of $\Delta v$, the absolute time-of-flight difference between the two reflectors (scattering centers) of interest may be calculated as $\Delta\tau_d=2\pi v/\Delta\psi_d$. Accordingly, at operation 2908 the method 2900 includes calculating the absolute time-of-flight difference between the two reflectors of interest. By way of non-limiting example, by calibrating $\Delta\tau_d$ at a nominal temperature and/or strain, the calibration $\Delta\tau_d$ may be compared to the current $\Delta\tau_d$ to infer the absolute temperature and/or strain.

In some embodiments, the absolute temperature and/or strain (or other effects transduced to temperature and/or strain) may be measured by including a calibration reference structure similar to that shown in FIG. 28. The calibration reference structure includes two reflectors (scattering centers, etc.), which are substantially isolated from temperature and/or strain (or are coupled to measurement devices to measure the temperature and/or strain acting on the calibration structure i.e., region of the system under test between the two reflectors). The reference calibration structure may lie anywhere along the system under test. A separate means of calibrating and inferring $\Delta\tau_{d_{ref}}$ (where $\Delta\tau_{d_{ref}}$ is the optical time-of-flight difference between reflective elements of the calibration structure) is used to obtain an accurate measurement of $\Delta\tau_{d_{ref}}$. The substantially fixed-frequency laser source is slowly (or more quickly as the case may be) moved through a change in optical frequency $\Delta v$ that is substantially known. The difference in interferometric phasors of the calibration structure is tracked as the laser is tuned over $\Delta v$ and denoted $\Delta\psi_{ref}$. The difference in any two interferometric phasors in the system under test subject to temperature and/or strain (i.e., measurement portion of the system under test as opposed to the calibration structure) is denoted $\Delta\psi_d$. In this case, an accurate absolute measure of $\Delta\tau_d$ may be obtained by taking $$\Delta\tau_d = \Delta\tau_{d_{ref}} \frac{\Delta\psi_d}{\Delta\psi_{ref}}$$

By performing an absolute measurement of $\Delta\tau_d$ for any desired pairs of reflectors (scattering centers) while the system-under-test is at rest (over the time taken to perform the calibration i.e., the time taken to move the laser through $\Delta v$), then continuing to track interferometric phasors thereafter, the dynamic, relative measurements enabled by OCoDR may be correctly offset by an absolute temperature (and/or strain, and/or any other effect able to be transduced to optical path length change) to form dynamic, absolute measurements representing the average measurand over any desired segment of the system under test.

Figure 30:
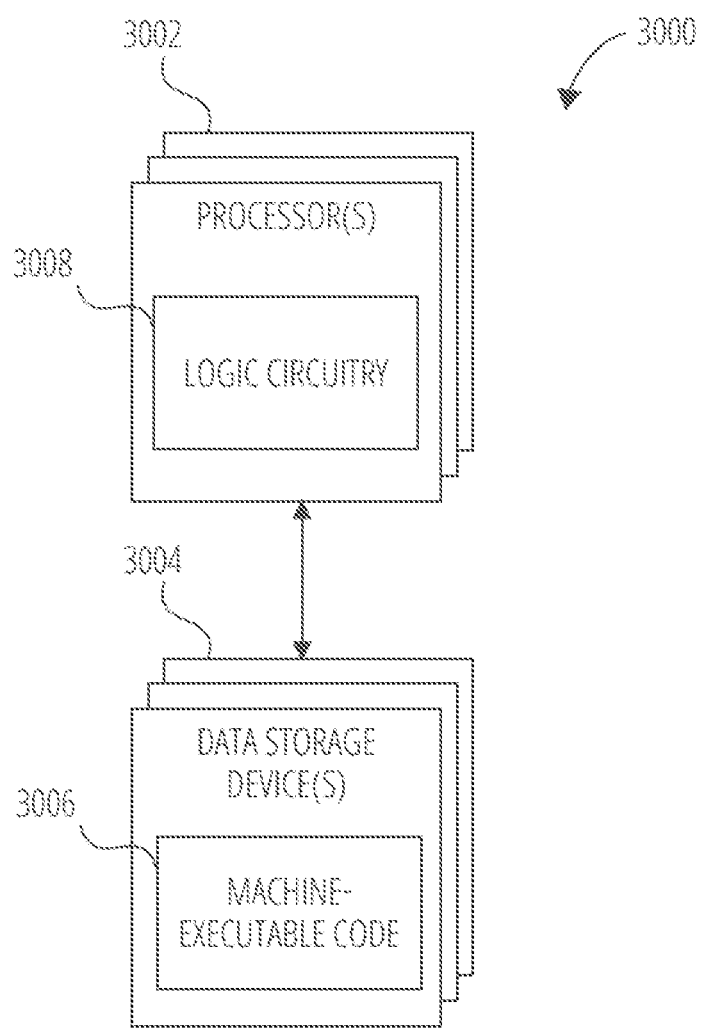
FIG. 30 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 30 illustrates non-limiting examples of implementations of functional elements disclosed herein. In some embodiments, some or all portions of the functional elements disclosed herein may be performed by hardware specially configured for carrying out the functional elements.

FIG. 30 is a block diagram of circuitry 3000 that, in some embodiments, may be used to implement various functions, operations, acts, processes, and/or methods disclosed herein. The circuitry 3000 includes one or more processors 3002 (sometimes referred to herein as "processors 3002") operably coupled to one or more data storage devices (sometimes referred to herein as "storage 3004"). The storage 3004 includes machine-executable code 3006 stored thereon and the processors 3002 include logic circuitry 3008. The machine-executable code 3006 includes information describing functional elements that may be implemented by (e.g., performed by) the logic circuitry 3008. The logic circuitry 3008 is adapted to implement (e.g., perform) the functional elements described by the machine-executable code 3006. The circuitry 3000, when executing the functional elements described by the machine-executable code 3006, should be considered as special purpose hardware configured for carrying out functional elements disclosed herein. In some embodiments the processors 3002 may be configured to perform the functional elements described by the machine-executable code 3006 sequentially, concurrently (e.g., on one or more different hardware platforms), or in one or more parallel process streams.

When implemented by logic circuitry 3008 of the processors 3002, the machine-executable code 3006 is configured to adapt the processors 3002 to perform operations of embodiments disclosed herein. For example, the machine-executable code 3006 may be configured to adapt the processors 3002 to perform at least a portion or a totality of the operations discussed for the control circuitry 104 of FIG. 1, the modulation signal source 114 of FIG. 1, the multiplier-accumulator architecture 200 of FIG. 2, the frequency domain architecture 300 of FIG. 3, the Zadoff-Chu sequence architecture 400 of FIG. 4, the signal processing scheme 1700 of FIG. 17, the signal processing scheme 2000 of FIG. 20, and/or the method 2900 of FIG. 29.

The processors 3002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA), a graphics processing unit (GPU), or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 3006 (e.g., software code, firmware code, hardware descriptions) related to embodiments of the present disclosure. It is noted that a general-purpose processor (may also be referred to herein as a host processor or simply a host) may be a microprocessor, but in the alternative, the processors 3002 may include any conventional processor, controller, microcontroller, or state machine. The processors 3002 may also be implemented as a combination of computing devices, such as a combination of a DSP and a microprocessor, a plurality of microprocessors, one or more microprocessors in conjunction with a DSP core, or any other such configuration.

In some embodiments the storage 3004 includes volatile data storage (e.g., random-access memory (RAM)), non-volatile data storage (e.g., Flash memory, a hard disc drive, a solid-state drive, erasable programmable read-only memory (EPROM), etc.). In some embodiments the processors 3002 and the storage 3004 may be implemented into a single device (e.g., a semiconductor device product, a system on chip (SoC), etc.). In some embodiments the processors 3002 and the storage 3004 may be implemented into separate devices.

In some embodiments the machine-executable code 3006 may include computer-readable instructions (e.g., software code, firmware code). By way of non-limiting example, the computer-readable instructions may be stored by the storage 3004, accessed directly by the processors 3002, and executed by the processors 3002 using at least the logic circuitry 3008. Also by way of non-limiting example, the computer-readable instructions may be stored on the storage 3004, transferred to a memory device (not shown) for execution, and executed by the processors 3002 using at least the logic circuitry 3008. Accordingly, in some embodiments the logic circuitry 3008 includes electrically configurable logic circuitry 3008.

In some embodiments the machine-executable code 3006 may describe hardware (e.g., circuitry) to be implemented in the logic circuitry 3008 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer level (RTL), a gate-level (GL) description, a layout-level description, or a mask-level description. As a non-limiting example, micro-operations to be performed by hardware logic circuits (e.g., gates, flip-flops, registers, without limitation) of the logic circuitry 3008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 3006 may include an HDL, an RTL, a GL description, a mask level description, other hardware description, or any combination thereof.

In embodiments where the machine-executable code 3006 includes a hardware description (at any level of abstraction), a system (not shown, but including the storage 3004) may be configured to implement the hardware description described by the machine-executable code 3006. By way of non-limiting example, the processors 3002 may include a programmable logic device (e.g., an FPGA or a PLC) and the logic circuitry 3008 may be electrically controlled to implement circuitry corresponding to the hardware description into the logic circuitry 3008. Also by way of non-limiting example, the logic circuitry 3008 may include hard-wired logic manufactured by a manufacturing system (not shown, but including the storage 3004) according to the hardware description of the machine-executable code 3006.

Regardless of whether the machine-executable code 3006 includes computer-readable instructions or a hardware description, the logic circuitry 3008 is adapted to perform the functional elements described by the machine-executable code 3006 when implementing the functional elements of the machine-executable code 3006. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
   a modulator configured to receive incident electromagnetic (EM) radiation at a substantially fixed frequency generated by one or more EM radiation sources, the incident EM radiation comprising continuous-wave EM radiation, the modulator configured to impart a sequence onto an amplitude, a phase, or both of the incident EM radiation to generate modulated EM radiation, the modulated EM radiation comprising continuous-wave EM radiation;
   a receiver configured to:
     receive reference EM radiation at the substantially fixed frequency generated by the one or more EM radiation sources, the reference EM radiation comprising continuous-wave EM radiation;
     receive reflected EM radiation from an optical system responsive to the modulated EM radiation;

generate interfered EM radiation responsive to the reference EM radiation and the reflected EM radiation; and generate a continuous interferogram responsive to the interfered EM radiation.

2. The apparatus of claim 1, wherein the sequence comprises a pseudo-random sequence, an at least substantially zero auto-correlation sequence, a constant amplitude zero autocorrelation (CAZAC) sequence, or a Zadoff-Chu sequence.

3. The apparatus of claim 1, wherein the optical system includes an optical fiber.

4. The apparatus of claim 3, wherein the optical fiber includes one or more of fiber Bragg gratings to reflect the modulated EM radiation at various locations within the optical fiber, reflective elements to reflect the modulated EM radiation at various locations within the optical fiber, or manufacturing imperfections to backscatter the modulated EM radiation via Rayleigh scatter.

5. The apparatus of claim 1, further including a dual polarization receiver configured to:

split the reflected EM radiation from the optical system under test into a first field component corresponding to a nominal polarization state and a second field component corresponding to an orthogonal polarization state; and interfere the first field component and the second field component with co-polarized local oscillator light to form two interferograms, the two interferograms representing responses of the optical system to a respective one of the nominal polarization state or the orthogonal polarization state.

6. The apparatus of claim 1, further including a dual polarization modulator configured to:

split incident local oscillator light into two fields;

modulate a phase, an amplitude, or both the phase and the amplitude of light in each of the two fields independently with a respective real or complex electrical signal; and combine the two fields into a single optical output field in which one field is configured in a nominal polarization state and a superposed second field is configured in an orthogonal polarization state;

wherein electrical signals driving the two fields comprise a same substantially zero autocorrelation sequence, the same substantially zero autocorrelation sequence driving the nominal polarization state being delayed with respect to the same substantially zero autocorrelation sequence driving the orthogonal polarization state, wherein a vector after signal processing includes one region or regions of the optical system responsive to the nominal polarization state and a second region or regions of the system under test responsive to the orthogonal polarization state.

7. The apparatus of claim 1, further comprising control circuitry configured to apply one of the sequence or a complex conjugate of the sequence to a digitized version of the continuous interferogram to extract phasors corresponding to different optical time-of-flight delays.

8. The apparatus of claim 7, wherein the control circuitry is configured to sense at least one of optical path length change of the optical system or any effect that is transduced to the optical path length change responsive to the phasors.

9. The apparatus of claim 8, wherein the optical path length change sensed by the control circuitry includes one or more of strain acting on the optical system, a temperature of the optical system, or a transverse force on the optical system.

10. An apparatus, comprising:

a receiver configured to:

generate interfered electromagnetic (EM) radiation responsive to reference EM radiation and reflected EM radiation, the reflected EM radiation received from a system under test responsive to modulated EM radiation provided to the system under test, the reference EM radiation and the modulated EM radiation including continuous-wave EM radiation; and generate a continuous interferogram responsive to the interfered EM radiation; and control circuitry configured to:

provide a sequence to a modulation signal source to generate the modulated EM radiation responsive to incident EM radiation;

digitize the continuous interferogram to obtain a digitized continuous interferogram; and extract phasors corresponding to different delays responsive to applying one of the sequence or a complex conjugate of the sequence to the digitized continuous interferogram.

11. A method of performing Optical Code Delay Reflectometry (OCoDR), the method comprising:

modulating a sequence on incident electromagnetic (EM) radiation to obtain modulated EM radiation, the sequence having at least substantially zero circular autocorrelation for non-zero shifts of the sequence;

injecting the modulated EM radiation into a system under test;

interfering reflected EM radiation received from the system under test responsive to the modulated EM radiation with reference EM radiation to obtain interfered EM radiation, the reference EM radiation including substantially fixed frequency continuous-wave EM radiation;

converting the interfered EM radiation into an electrical signal;

digitizing the electrical signal to obtain a digitized continuous interferogram; and applying one of the sequence or a complex conjugate of the sequence to the digitized continuous interferogram to obtain phasors corresponding to different delays.

12. The method of claim 11, wherein applying the one of the sequence or the complex conjugate of the sequence to the digitized continuous interferogram comprises:

multiplying various circularly-shifted or time-shifted copies of the sequence with the digitized continuous interferogram to obtain products; and summing the products over a sequence length of the sequence to recover the phasors.

13. The method of claim 12, wherein amplitudes of the phasors substantially correspond with amplitudes of the reflected EM radiation at a location within the system under test proportional to the shift of the sequence.

14. The method of claim 12, wherein phases of the phasors substantially correspond with an optical time-of-flight delay or delay change of the system under test at a location within the system under test proportional to the shift of the sequence.

15. The method of claim 11, wherein applying the one of the sequence or the complex conjugate of the sequence to the digitized continuous interferogram comprises:

inferring a frequency-domain representation of the sequence;

inferring a frequency-domain representation of the digitized continuous interferogram;
complex conjugating one of the frequency-domain representation of the sequence or the frequency-domain representation of the digitized continuous interferogram;
multiplying a complex conjugated one of the frequency-domain representation of the sequence and the frequency-domain representation of the digitized continuous interferogram with the other of the frequency-domain representation of the sequence and the frequency-domain representation of the digitized continuous interferogram to obtain a product; and
inferring an inverse-frequency-domain representation of the product to obtain a vector of phasors.

16. A method of performing Optical Code Delay Reflectometry (OCoDR), the method comprising:
modulating a Zadoff-Chu sequence on incident electromagnetic (EM) radiation to obtain modulated EM radiation, the incident EM radiation and the modulated EM radiation including continuous-wave EM radiation;
injecting the modulated EM radiation into an optical fiber;
interfering reflected EM radiation received from the optical fiber responsive to the modulated EM radiation with reference EM radiation to generate interfered EM radiation;
converting the interfered EM radiation to an electronic signal comprising an interferogram;
digitizing the electronic signal to generate a digitized interferogram;
determining a complex conjugate of one of the Zadoff-Chu sequence or the digitized interferogram;
multiplying the complex conjugate of the one of the Zadoff-Chu sequence or the digitized interferogram with the other of the Zadoff-Chu sequence or the digitized interferogram to generate a product; and
determining a frequency-domain representation of the product to recover a vector of phasors.

17. The method of claim 16, wherein the frequency-domain representation is taken over a number of samples smaller than a length of the Zadoff-Chu sequence to yield an output sample rate faster than an inverse of an optical time-of-flight delay corresponding to the length of the Zadoff-Chu sequence.

18. The method of claim 17, wherein amplitudes of the phasors correspond with amplitudes of back-reflected signals at locations within the optical fiber proportional to shifts of the Zadoff-Chu sequence.

19. The method of claim 17, wherein phases of the phasors correspond with optical time-of-flight delays or delay changes of the optical fiber at locations within the optical fiber proportional to shifts of the Zadoff-Chu sequence.

20. The method of claim 17, wherein the optical fiber includes one or more of:
fiber Bragg gratings to reflect the modulated EM radiation at various locations within the optical fiber;
reflective elements to reflect the modulated EM radiation at various locations within the optical fiber; or
imperfections exhibiting Rayleigh scatter by which the modulated EM radiation is backscattered within the optical fiber.

21. The method of claim 17, further comprising inferring a condition of the optical fiber based on amplitudes, phases, or both of the vector of phasors.

22. The method of claim 21, wherein inferring the condition includes inferring one or more of birefringence, temperature, strain, or any effect that is transduced to the birefringence, the temperature, or the strain.

* * * * *

UNITED STATES PATENT AND TRADEMARK OFFICE
CERTIFICATE OF CORRECTION

PATENT NO. : 11,949,458 B2
APPLICATION NO. : 17/813831
DATED : April 2, 2024
INVENTOR(S) : Ryan Seeley and Rhett H. Redd It is certified that error appears in the above-identified patent and that said Letters Patent is hereby corrected as shown below:

In the Specification

Column 1, Lines 18-19, change "Number N683352000183 awarded" to --Number N6833520C0183 awarded--

Column 10, Line 29, change "$u_l(t)$ and $u_d(t)$)" to --($u_l(t)$ and $u_d(t)$)--

Column 10, Line 42, change "$\theta(t)=\phi(t-\tau_l)-\phi(t-\tau_d)$" to --$\theta(t)=\phi(t-\tau_l)-\phi(t-\tau_d)$.--

Column 10, Line 59, change "test (ad)" to --test ($\alpha_d$)--

Column 10, Line 62, change "when AT" to --when $\Delta\tau$--

Column 12, Line 20, change "$e^{i\pi/2(1-A(t-\tau d))}$" to --$e^{i\pi/2(1-A(t-\tau d))}$.--

Column 12, Line 25, change "--$A(t-\tau_d)i\pi/2(1-A(t-\tau_d))$" to --$A(t-\tau_d)e^{i\pi/2(1-A(t-\tau d))}e^{i2\pi v_0 \Delta\tau}=e^{i2\pi v_0 \Delta\tau}$.--

Column 12, Line 29, change "$(1-A(t))|_{A(t)=+1}$" to --$(1-A(t))_{A(t)\neq+1}$--

Column 12, Line 32, change "$(1-A(t))|_{A(t)=+1}$" to --$(1-A(t))_{A(t)\neq-1}$--

Column 12, Line 34, change "$e^{i2\pi v_0 \Delta r}$." to --$e^{i2\pi v_0 \Delta\tau}$.--

Column 13, Line 25, change "$U_{clpx}(t)$" to --$U_{cplx}(t)$--

Column 13, Line 29, change "$\Delta\tau_j=\tau_l=td_j$. The" to --$\Delta\tau_j=\tau_l-td_j$. The--

Column 13, Line 30, change "where p is the" to --where $\rho$ is the--

Column 13, Line 42, change "$A(t-\tau_k)\cdot U_{clpx}(t) =$" to --$A(t-\tau_k)\cdot U_{cplx}(t) =$--

Column 13, Line 58, change "$A(t-\tau_k)\cdot U_{clpx}(t)$" to --$A(t-\tau_k)\cdot U_{cplx}(t)$--

Column 14, Line 3, change "$A(t-\tau_k)\cdot U_{clpx}(t) \approx$" to --$A(t-\tau_k)\cdot U_{cplx}(t) \approx$--

Column 17, Line 32, change "$z[k] = e^{-i\pi\frac{rk(k+t_f+2q)}{N}}$," to --$z[k] = e^{-i\pi\frac{rk(k+c_f+2q)}{N}}$,--

Column 17, Line 34, change "q☐Z imparts" to --$q \in Z$ imparts--

Column 17, Line 36, change "r☐Z defines" to --$r \in Z$ defines--

Column 17, Line 37, change "when t=1/f, yields" to --when $t=1/f_s$ yields--

Column 17, Line 43, change "$z(t) = e^{-i\pi\frac{r}{N}f_B^2 t^2} e^{-i\pi\frac{r}{N}(c_f + 2_q)f_s^t}$." to --$z(t) = e^{-i\frac{r}{N}f_B^2 t^2} e^{i\frac{r}{N}(c_f + 2_q)f_s^t}$.--

Signed and Sealed this
Eighteenth Day of June, 2024

*Katherine Kelly Vidal*

Katherine Kelly Vidal
*Director of the United States Patent and Trademark Office*

CERTIFICATE OF CORRECTION (continued)
U.S. Pat. No. 11,949,458 B2

| | | |
|---|---|---|
| Column 18, | Line 22, | change "$u_l=\rho 9t-\tau_l)a_l e^{-i\phi(t-\tau_l)}$." to --$u_l=\rho(t-\tau_l)a_l e^{-i\phi(t-\tau_l)}$.-- |
| Column 18, | Line 33, | change "$\cos(\phi(t-\tau d)-\phi(t-\tau d)$" to --$\cos(\phi(t-\tau_l)-\phi(t-\tau_d)$-- |
| Column 18, | Line 35, | change "$\sin(\phi(t-\tau d)-\phi(t-\tau d)$" to --$\sin(\phi(t-\tau_l)-\phi(t-\tau_d)$-- |
| Column 18, | Line 39, | change "$\rho(t-\tau_d)\alpha_l\rho(t-\tau_d\alpha_d(\tau_d)$" to --$\rho(t-\tau_l)\alpha_l\rho(t-\tau_d)\alpha_d(\tau_d)$-- |
| Column 18, | Line 44, | change "$\theta_d(t,\tau_d)=\phi(t-\tau_d)$" to --$\theta_d(t,\tau_d)=\phi(t-\tau_l)$-- |
| Column 21, | Line 59, | change "to +π C radians." to --to +π: radians.-- |
| Column 32, | Line 39, | change "$\Delta\tau_d=2\pi v/\Delta\psi_d$." to --$\Delta\tau_d=2\pi\Delta v/\Delta\psi_d$.-- |